(12) United States Patent
Sengoku

(10) Patent No.: US 10,031,547 B2
(45) Date of Patent: Jul. 24, 2018

(54) CCIE RECEIVER LOGIC REGISTER WRITE ONLY WITH RECEIVER CLOCK

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 14/572,680

(22) Filed: Dec. 16, 2014

(65) Prior Publication Data

US 2015/0168991 A1    Jun. 18, 2015

Related U.S. Application Data

(60) Provisional application No. 61/917,895, filed on Dec. 18, 2013.

(51) Int. Cl.
  *G06F 1/04*  (2006.01)
  *G06F 1/32*  (2006.01)
  (Continued)

(52) U.S. Cl.
  CPC ............ *G06F 1/04* (2013.01); *G06F 13/4221* (2013.01); *G06F 13/4282* (2013.01);
  (Continued)

(58) Field of Classification Search
  CPC ........ G06F 1/04; G06F 1/324; G06F 13/4282; G06F 13/4291; G06F 13/4295;
  (Continued)

(56) References Cited

U.S. PATENT DOCUMENTS 5,640,605 A * 6/1997 Johnson ................ G06F 13/387
  375/279
5,850,422 A    12/1998 Chen
  (Continued)

FOREIGN PATENT DOCUMENTS

| CN | 1902613 A | 1/2007 |
| DE | 2440768 A1 | 3/1976 |
| GB | 2120054 A | 11/1983 |

OTHER PUBLICATIONS

International Search Report and Written Opinion—PCT/US2014/070935—ISA/EPO—Mar. 12, 2015.

*Primary Examiner* — Ji H Bae
(74) *Attorney, Agent, or Firm* — Loza & Loza LLP

(57) ABSTRACT

Methods, apparatus, and computer program products are described, which provide a mechanism that enables data to be written into registers of a slave device without a free-running clock, while facilitating an efficient sleep and wakeup mechanism for slave devices. A receiver device may receive a plurality of symbols over a shared bus, extract a receive clock signal embedded in symbol-to-symbol transitions of the plurality of symbols, convert the plurality of symbols into a transition number, convert the transition number into data bits, and store at least a portion of the data bits into one or more registers using only the receive clock signal. The receiver device may start a down counter upon detection of a first cycle of the clock signal, trigger a marker when the down counter reaches a pre-defined value, and use the marker to store at least a portion of the data bits into registers.

27 Claims, 21 Drawing Sheets

(51) Int. Cl.
  *G06F 13/00*      (2006.01)
  *H04L 7/00*       (2006.01)
  *H04L 7/027*      (2006.01)
  *G06F 13/42*      (2006.01)

(52) U.S. Cl.
  CPC ...... *G06F 13/4291* (2013.01); *G06F 13/4295* (2013.01); *G06F 1/324* (2013.01); *G06F 1/3237* (2013.01); *G06F 13/00* (2013.01); *H04L 7/0087* (2013.01); *H04L 7/027* (2013.01)

(58) Field of Classification Search
  CPC .... G06F 13/00; G06F 1/3237; G06F 13/4221; H04L 7/0087; H04L 7/027
  USPC ............ 713/500, 600; 375/359, 360; 710/61

See application file for complete search history.

(56) References Cited

U.S. PATENT DOCUMENTS

| | | | |
|---|---|---|---|
| 7,007,120 B2 | 2/2006 | Spencer et al. | |
| 7,289,528 B2 | 10/2007 | Moat et al. | |
| 7,444,558 B2 | 10/2008 | Mitbander et al. | |
| 7,916,820 B2* | 3/2011 | Cranford, Jr. | H04L 7/0004 370/503 |
| 8,417,900 B1 | 4/2013 | Perozo et al. | |
| 2005/0141661 A1 | 6/2005 | Renaud et al. | |
| 2009/0092212 A1 | 4/2009 | Ko | |
| 2014/0270026 A1* | 9/2014 | Sengoku | H04L 7/027 375/355 |
| 2015/0100711 A1* | 4/2015 | Sengoku | G06F 1/04 710/106 |
| 2015/0195211 A1* | 7/2015 | Sengoku | H04L 47/34 375/222 |
| 2015/0220472 A1* | 8/2015 | Sengoku | G06F 13/4068 375/340 |

* cited by examiner $$\begin{aligned}\text{Bits} =\ & T_{11} \times 3^{11} \\ +\ & T_{10} \times 3^{10} \\ +\ & T_9 \times 3^9 \\ +\ & T_8 \times 3^8 \\ +\ & T_7 \times 3^7 \\ +\ & T_6 \times 3^6 \\ +\ & T_5 \times 3^5 \\ +\ & T_4 \times 3^4 \\ +\ & T_3 \times 3^3 \\ +\ & T_2 \times 3^2 \\ +\ & T_1 \times 3 \\ +\ & T_0 \end{aligned}$$

$T_{11} = Bits / 3^{11}$, $M_{11} = Bits \% 3^{11}$
$T_{10} = M_{11} / 3^{10}$, $M_{10} = M_{11} \% 3^{10}$
$T_9 = M_{10} / 3^9$, $M_9 = M_{10} \% 3^9$
$T_8 = M_9 / 3^8$, $M_8 = M_9 \% 3^8$
$T_7 = M_8 / 3^7$, $M_7 = M_8 \% 3^7$
$T_6 = M_7 / 3^6$, $M_6 = M_7 \% 3^6$
$T_5 = M_6 / 3^5$, $M_5 = M_6 \% 3^5$
$T_4 = M_5 / 3^4$, $M_4 = M_5 \% 3^4$
$T_3 = M_4 / 3^3$, $M_3 = M_4 \% 3^3$
$T_2 = M_3 / 3^2$, $M_2 = M_3 \% 3^2$
$T_1 = M_2 / 3$, $M_1 = M_2 \% 3$
$T_0 = M_1$ $$T_{11} = (\text{Bits} \geq 3^{11}) \ ? \ 2 : (\text{Bits} \geq 3^{11} \times 2) \ ? \ 1 : 0, \quad M_{11} = \text{Bits} - T_{11} \times 3^{11}$$
$$T_{10} = (M_{11} \geq 3^{10}) \ ? \ 2 : (M_{11} \geq 3^{10} \times 2) \ ? \ 1 : 0, \quad M_{10} = M_{11} - T_{10} \times 3^{10}$$
$$T_9 = (M_{10} \geq 3^9) \ ? \ 2 : (M_{10} \geq 3^9 \times 2) \ ? \ 1 : 0, \quad M_9 = M_{10} - T_9 \times 3^9$$
$$T_8 = (M_9 \geq 3^8) \ ? \ 2 : (M_9 \geq 3^8 \times 2) \ ? \ 1 : 0, \quad M_8 = M_9 - T_8 \times 3^8$$
$$T_7 = (M_8 \geq 3^7) \ ? \ 2 : (M_8 \geq 3^7 \times 2) \ ? \ 1 : 0, \quad M_7 = M_8 - T_7 \times 3^7$$
$$T_6 = (M_7 \geq 3^6) \ ? \ 2 : (M_7 \geq 3^6 \times 2) \ ? \ 1 : 0, \quad M_6 = M_7 - T_6 \times 3^6$$
$$T_5 = (M_6 \geq 3^5) \ ? \ 2 : (M_6 \geq 3^5 \times 2) \ ? \ 1 : 0, \quad M_5 = M_6 - T_5 \times 3^5$$
$$T_4 = (M_5 \geq 3^4) \ ? \ 2 : (M_5 \geq 3^4 \times 2) \ ? \ 1 : 0, \quad M_4 = M_5 - T_4 \times 3^4$$
$$T_3 = (M_4 \geq 3^3) \ ? \ 2 : (M_4 \geq 3^3 \times 2) \ ? \ 1 : 0, \quad M_3 = M_4 - T_3 \times 3^3$$
$$T_2 = (M_3 \geq 3^2) \ ? \ 2 : (M_3 \geq 3^2 \times 2) \ ? \ 1 : 0, \quad M_2 = M_3 - T_2 \times 3^2$$
$$T_1 = (M_2 \geq 3) \ ? \ 2 : (M_2 \geq 3 \times 2) \ ? \ 1 : 0, \quad M_1 = M_2 - T_1 \times 3$$
$$T_0 = M_1$$

CCIe RECEIVER LOGIC REGISTER WRITE ONLY WITH RECEIVER CLOCK

CROSS-REFERENCE TO RELATED APPLICATIONS

This application claims priority to and the benefit of provisional patent application No. 61/917,895, which was filed in the United State Patent Office on Dec. 18, 2013, the entire content of which is incorporated herein by reference.

FIELD

The present disclosure pertains to enabling efficient operations over a shared bus and, more particularly, simplifying transmission and/or reception over the shared bus by embedding a clock within transcoded transmissions.

BACKGROUND

I2C (also referred to as $I^2C$) is a multi-master serial single-ended bus used for attaching low-speed peripherals to a motherboard, embedded system, cellphone, or other electronic devices. The I2C bus includes a clock (SCL) and data (SDA) lines with 7-bit addressing. The bus has two roles for devices: master and slave. A master device is a node that generates the clock and initiates communication with slave devices. A slave device is a node that receives the clock and responds when addressed by the master device. The I2C bus is a multi-master bus which means any number of master devices can be present. Additionally, master and slave roles may be changed between messages (after a STOP is sent). I2C defines basic types of messages, each of which begins with a START and ends with a STOP.

In this context of a camera implementation, unidirectional transmissions may be used to capture an image from a sensor and transmit such image data to memory in a baseband processor, while control data may be exchanged between the baseband processor and the sensor as well as other peripheral devices. In one example, a Camera Control Interface (CCI) protocol may be used for such control data between the baseband processor and the image sensor (and/or one or more slave devices). In one example, the CCI protocol may be implemented over an I2C serial bus between the image sensor and the baseband processor.

An extension to CCI called CCIe (Camera Control Interface extended) has been developed that encodes information for transmission over the shared bus. CCIe does not implement a separate clock line on the shared bus. Instead, it embeds a clock within the transmitted transcoded information. However, such embedded clock may serve for reception of data and/or synchronization purposes, it may be insufficient to permit saving such data into registers.

Additionally, a mechanism is needed to allow slave devices to go into a power saving or sleep mode but also allow a master device to write data to the slave device. This may be done by having the master device track slave devices that are in sleep mode, but such mechanism adds unwanted overhead.

Therefore, a solution is needed that efficiently uses a recovered clock embedded within a transmission to allow writing data into registers of a slave device without a free-running clock while facilitating an efficient sleep and wakeup mechanism for slave devices.

SUMMARY

In an aspect of the disclosure, a method, a computer program product, and an apparatus are provided that provide a mechanism that enables data to be written into registers of a slave device without a free-running clock, while facilitating an efficient sleep and wakeup mechanism for slave devices.

In certain aspects, a method performed by a receiver device includes receiving a plurality of symbols over a shared bus, extracting a clock signal embedded in symbol-to-symbol transitions of the plurality of symbols, converting the plurality of symbols into a transition number, converting the transition number into data bits, and storing at least a portion of the data bits into one or more registers using only the clock signal.

In one aspect, the symbols transition every clock cycle such that no two sequential symbols have the same value.

In one aspect, the receiver device independently enters a sleep mode without notifying any other devices coupled to the shared bus.

In one aspect, the receiver device receives and writes at least a portion of the data bits to the one or more registers without use of a local free-running clock. The receiver device may receive and write at least a portion of the data bits to the one or more registers while the receiver is in a sleep mode.

In one aspect, the transition number may be expressed as a ternary number. In one example, the transition number may be a twelve digit ternary number.

In one aspect, the shared bus is a camera control interface extended (CCIe) bus.

In one aspect, at least a portion of the data bits is written into the one or more registers by starting a down counter upon detection of a first cycle of the clock signal, triggering a marker when the down counter reaches a pre-defined value, and using the marker to store at least a portion of the data bits into registers. The pre-defined value may occur when a final clock cycle of the clock signal is reached.

In one aspect, the transition number is converted into the data bits between a penultimate clock cycle and a last clock cycle of the clock signal, and at least a portion of the data bits is stored into registers at a last clock cycle of the clock signal.

In certain aspects, a receiver device includes a bus interface adapted to couple the receiver device to a shared bus to receive a plurality of symbols, one or more registers, and a receiver circuit coupled to the bus interface. The receiver circuit may be configured to extract a clock signal embedded in symbol-to-symbol transitions of the plurality of symbols, convert the plurality of symbols into a transition number, convert the transition number into a data bits, and store at least a portion of the data bits into the one or more registers using only the clock signal.

In certain aspects, a receiver device includes means for receiving a plurality of symbols over a shared bus, means for extracting a clock signal embedded in symbol-to-symbol transitions of the plurality of symbols, means for converting the plurality of symbols into a transition number, means for converting the transition number into a data bits, and means for storing at least a portion of the data bits into registers using only the clock signal.

In certain aspects, a machine-readable storage medium has instructions stored thereon. The storage medium may include a transitory and/or a non-transitory storage medium. The instructions may be executed by at least one processor, and the instructions may cause the at least one processor to receive a plurality of symbols over a shared bus, extract a clock signal embedded in symbol-to-symbol transitions of the plurality of symbols, convert the plurality of symbols into a transition number, convert the transition number into a data bits, and store at least a portion of the data bits into registers using only the clock signal.

DRAWINGS

Various features, nature, and advantages may become apparent from the detailed description set forth below when taken in conjunction with the drawings in which like reference characters identify correspondingly throughout.

FIG. 18 illustrates an example of a synthesizable implementation of the division and the module operations of FIG. 17.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments.

Overview

A first feature provides a way of converting data bits into a ternary number. The ternary number is then converted into a plurality of symbols by sending a most significant digit of the ternary number to a transcoder first. The plurality of symbols is then transmitted over a bus. For example, the plurality of symbols may be transmitted over a camera control interface extended (CCIe) bus.

A second feature provides for a receiver device that is configured to extract the embedded clock from a received transmission and store data therein into registers solely using the embedded clock (without a free running clock or using padded filler transmissions to generate an extra clock cycle). Therefore, the receiver device can receive and store information even when the receiver device is in a sleep mode (when no free-running clock is available).

Exemplary Method for Simplifying Symbol Coding and Transmission Over CCIe Bus

Figure 1:
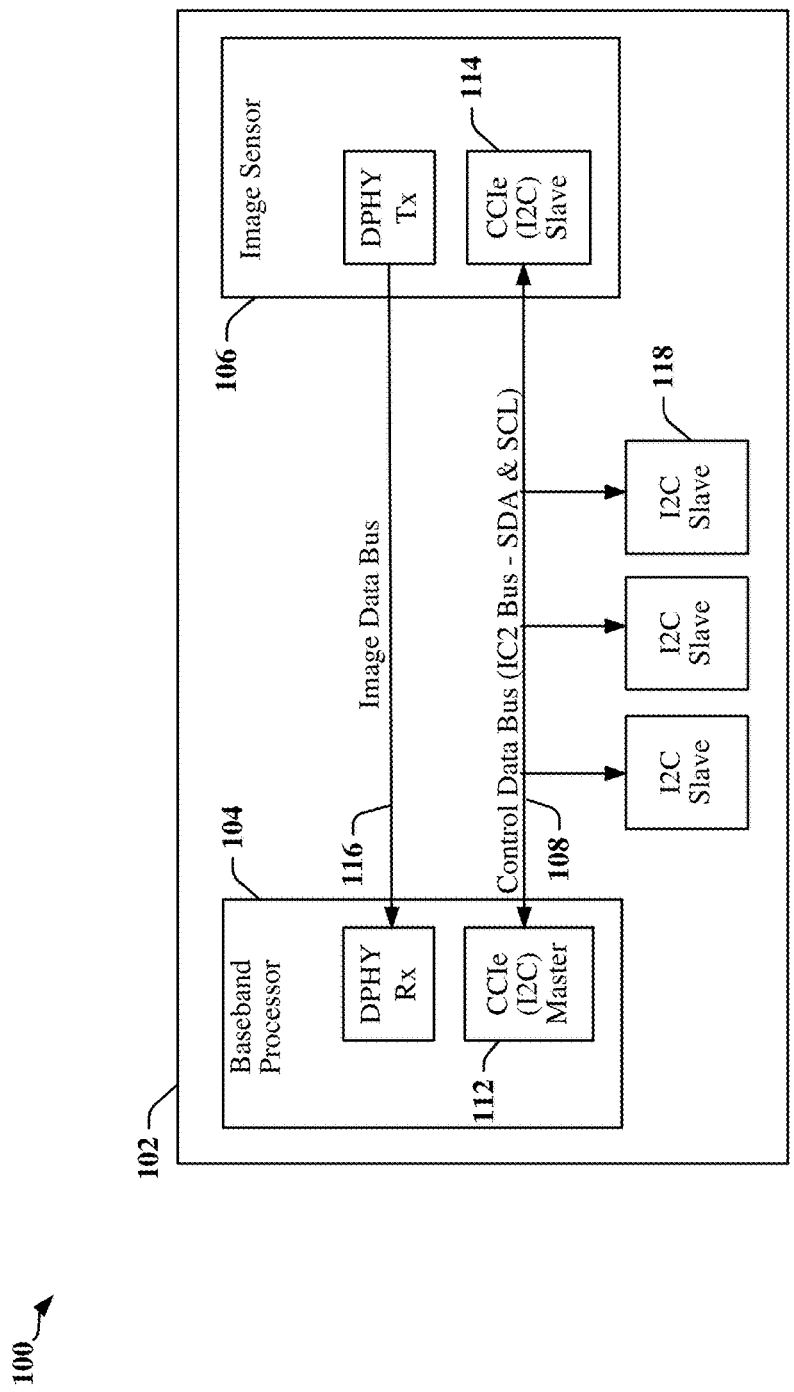
FIG. 1 is a block diagram illustrating a device having a baseband processor and an image sensor and implementing an image data bus and a multi-mode control data bus.

FIG. 1 is a block diagram illustrating a device 102 having a baseband processor 104 and an image sensor 106 and implementing an image data bus 116 and a multi-mode control data bus 108. While FIG. 1 illustrates the multi-mode control data bus 108 within a camera device, it should be clear that this control data bus 108 may be implemented in various different devices and/or systems. Image data may be sent from the image sensor 106 to the baseband processor 104 over an image data bus 116 (e.g., a high speed differential DPHY link). In one example, the control data bus 108 may be an I2C bus comprising two wires, a clock line (SCL) and a serial data line (SDA). The clock line SCL may be used to synchronize all data transfers over the I2C bus (control data bus 108). The data line SDA and clock line SCL are coupled to all devices 112, 114, and 118 on the I2C bus (control data bus 108). In this example, control data may be exchanged between the baseband processor 104 and the image sensor 106 as well as other peripheral devices 118 via the control data bus 108. The standard clock (SCL) speed for I2C is up to 100 KHz. The standard clock SCL speed in I2C fast mode is up to 400 KHz, and in I2C fast mode plus (Fm+) it is up to 1 MHz. These operating modes over an I2C bus may be referred to as a camera control interface (CCI) mode when used for camera applications.

According to one aspect, an improved mode of operation (i.e., greater than 1 MHz) may be implemented over the multi-mode control data bus 108 to support camera operation. This improved mode of operation over an I2C bus may be referred to as a camera control interface extension (CCIe)

mode when used for camera applications. In this example, the baseband processor 104 includes a master device/node 112 and the image sensor 106 includes a slave device/node 114, both the master device/node 112 and slave device/node 114 may operate according to the camera control interface extension (CCIe) mode over the control data bus 108 without affecting the proper operation of other legacy I2C devices coupled to the control data bus 108. According to one aspect, this improved mode over the control data bus 108 may be implemented without any bridge device between CCIe devices and legacy I2C slaves devices.

Figure 2:
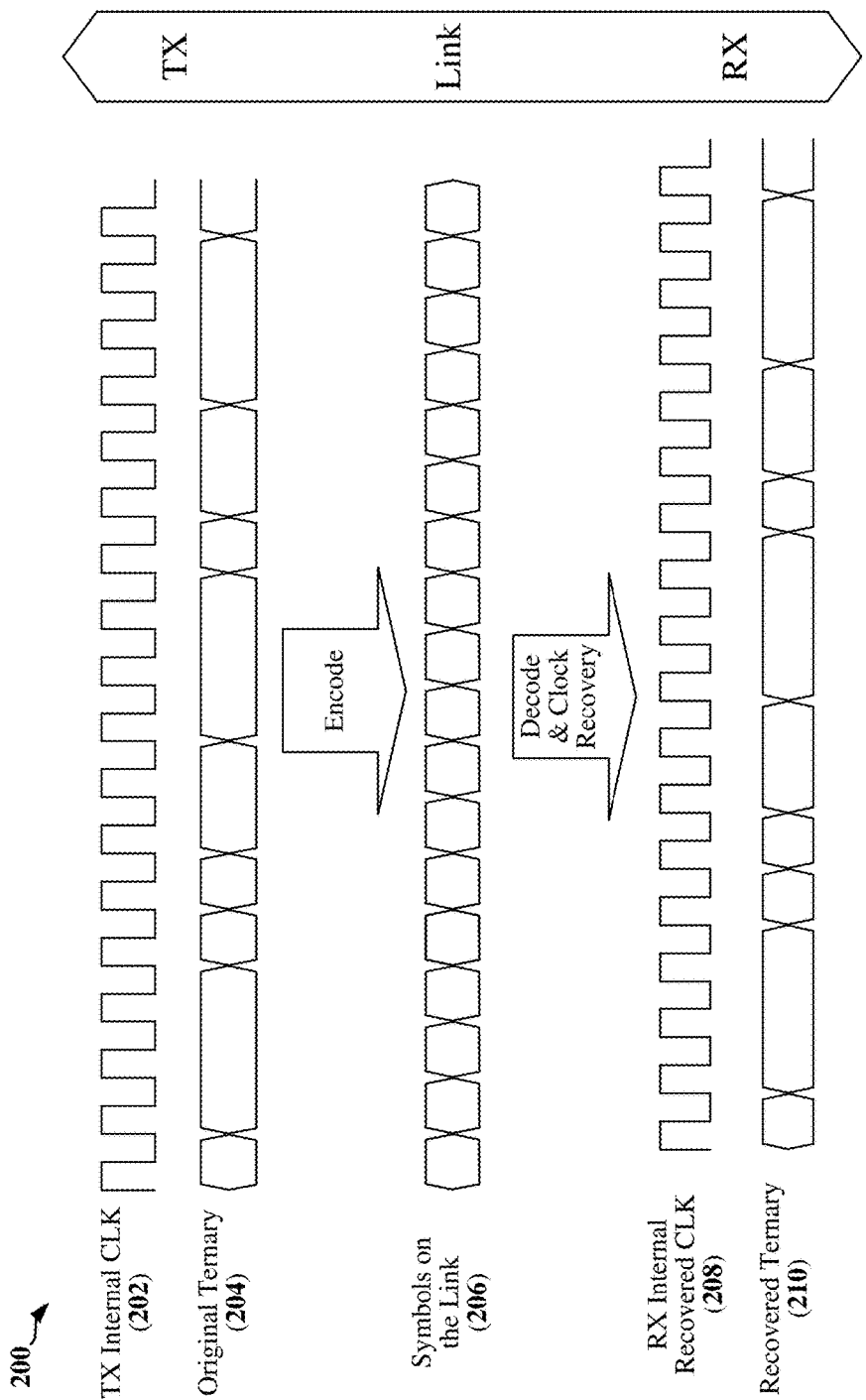
FIG. 2 illustrates embedding of clock information within data symbols, thereby allowing the use of both I2C wires (SDA and SCL lines) for data transmissions.

FIG. 2 illustrates how a clock may be embedded within data symbols, thereby allowing the use of both I2C wires (i.e., SDA line and SCL line) for data transmissions. In one example, the clock may be embedded through the use of transition clock transcoding. Transition clock transcoding may involve transcoding original data into symbol data such that there is a transition in the signaling state of a communication link between consecutive symbols (i.e. the symbol value transitions at every symbol cycle). That is to say, the data 204 to be transmitted over the physical link (wires) may be transcoded such that signaling state of the physical link changes at every symbol cycle of the transmitted symbols 206. Consequently, the original clock 202 is embedded in the change of symbol states at every symbol cycle.

A receiver recovers clock information 208 from the state transition at each symbol (in the transmitted symbols 206) and then reverses the transcoding of the transmitted symbols 206 to obtain the original data 210. This allows both wires of the I2C bus (control data bus 108 in FIG. 1, SDA line and SCL line) to be used to send data information. Additionally, the symbol rate can be doubled since it is no longer necessary to have a setup and hold time between clock and data signals.

Figure 3:
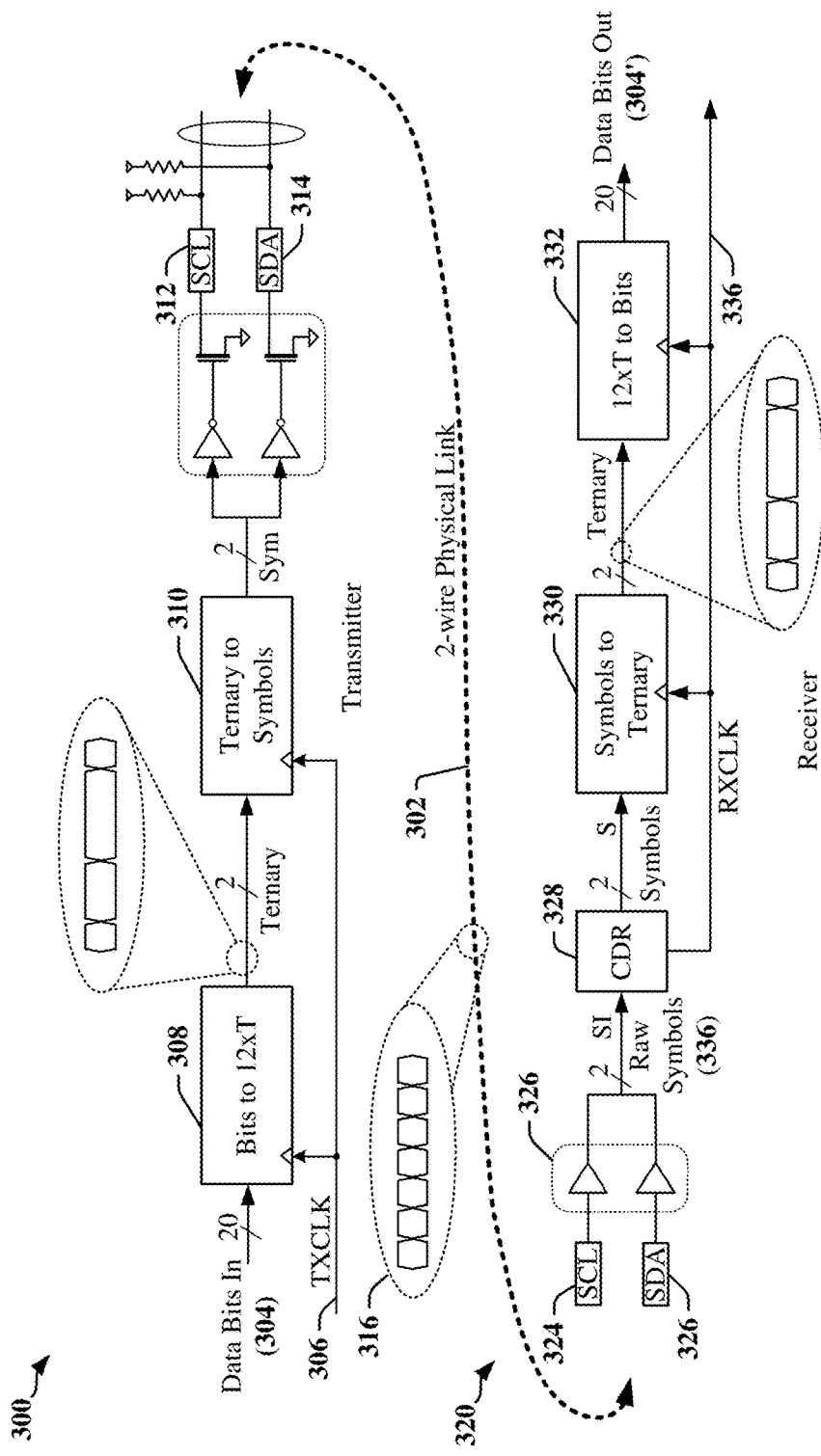
FIG. 3 is a block diagram illustrating an example of data transcoding at a transmitter that produces transcoded symbols with embedded clock information.

FIG. 3 is a block diagram illustrating one example of a method for transcoding of data bits into transcoded symbols at a transmitter to embed a clock signal within the transcoded symbols. At the transmitter 300, input data bits 304 are converted into a multi-digit ternary (base 3) number, where each digit may be referred to as a "transition number." The ternary number is then converted into a set of (sequential) symbols which are transmitted over the clock line SCL 312 and the data line SDA 314 of a physical link 302. In one example, an original 20-bits of binary data is input to a bit-to-transition number converter block 308 to be converted to a 12-digits ternary number. Each digit of a 12-digits ternary number represents a "transition number." Two consecutive transition numbers may have the same value. Each transition number is converted into a sequential symbol at a transition-to-symbol block 310 such that no two consecutive sequential symbols have the same value. Because a transition in symbol value (and signaling state of the wires 312, 314) is guaranteed between the symbols in every pair of sequential symbols, the sequential symbol transition may serve to embed a clock signal. Each sequential symbol 316 is then sent over a two wire physical link 302 which may include an I2C bus having a SCL line 312 and a SDA line 314.

Figure 4:
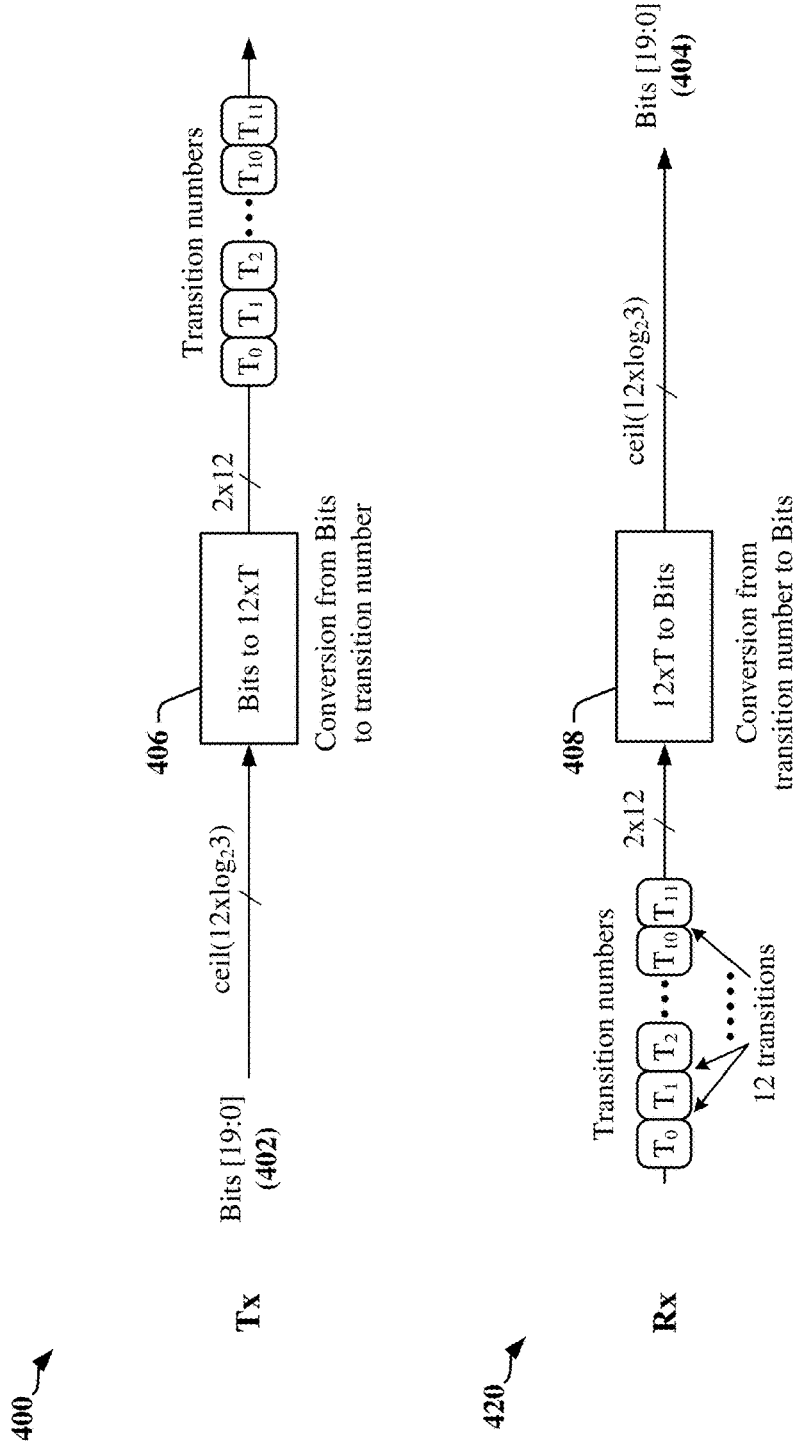
FIG. 4 illustrates an example in which bits are converted to transition numbers at a transmitter, and transition numbers are converted to bits at a receiver.

FIG. 4 illustrates an example of the conversion from bits to transition numbers at a transmitter 400, and then from transition numbers to bits at a receiver 420. This example illustrates the transmission for a 2-wire system using 12 transition symbols. The transmitter 400 feeds binary information, Bits, into a "Bits to 12×T" converter 406 to generate 12 symbol transition numbers, $T_{11}$ to $T_0$. The receiver 420 receives 12 symbols transition numbers, $T_{11}$ to $T_0$, which are fed into a "12×T to Bits" converter 408 to retrieve the binary information (Bits). When there are r possible symbol transition states for each transition ($T_0$-$T_{11}$), 12 transitions can send $r^{12}$ different states. For a 2-wire bus, $r=2^2-1$. Consequently, transitions $T_0$ . . . $T_{11}$ contain data that can have $(2^2-1)^{12}$ different states. Consequently, $r=4-1=3$ and the number of states=$(4-1)^{\wedge}12=531441$.

In this example for 2-wire system using 12 symbol transition numbers, it may be assumed the possible symbol transitions for each transition r is 3 ($=2^2-1$). If the number of symbols in a group 12, a 12-digit ternary number (base-3 number): $T_{11}$, $T_{10}$, . . . , $T_2$, $T_1$, $T_0$, where each $T_i$: 0, 1, 2, may be used. For example, for $\{T_{11}, T_{10}, \ldots T_2, T_1, T_0\}=\{2, 1, 0, 0, 1, 1, 0, 1, 0, 1, 2, 1\}$, the ternary number is:

$$2100\_1101\_0121_3 \text{(Ternary number)} =$$
$$2 \times 3^{11} + 1 \times 3^{10} + 0 \times 3^9 + 0 \times 3^8 + 1 \times 3^7 + 1 \times 3^6 + 0 \times 3^5 +$$
$$1 \times 3^4 + 0 \times 3^3 + 1 \times 3^2 + 2 \times 3^1 + 1 \times 3^0 = 416356(0 \times 65A64).$$

In this manner, 12 transitions numbers may be converted into a number. Note that the ternary number $2100\_1101\_0121_3$ may be used as the transition number, for example, in FIG. 3, so that each integer may be mapped to a sequential symbol and vice versa. When sending $2100\_1101\_0121_3$ in inverse order, the transition numbers are sent in decreasing order of power, i.e., $T_{11}$ is the digit to be multiplied by $3^{11}$ so it is of the eleventh power and so forth.

The example illustrated in FIG. 4 for a 2-wire system and 12 symbol transition numbers may be generalized to an n-wire system and m symbol transition numbers. If there are r possible symbol transition states per one T, $T_0$ to $T_{m-1}$, m transitions can send $r^m$ different states, i.e., $r=2^n-1$. Consequently, transitions $T_0$ . . . $T_{m-1}$ contain data that can have $(2^n-1)^m$ different states.

Figure 5:
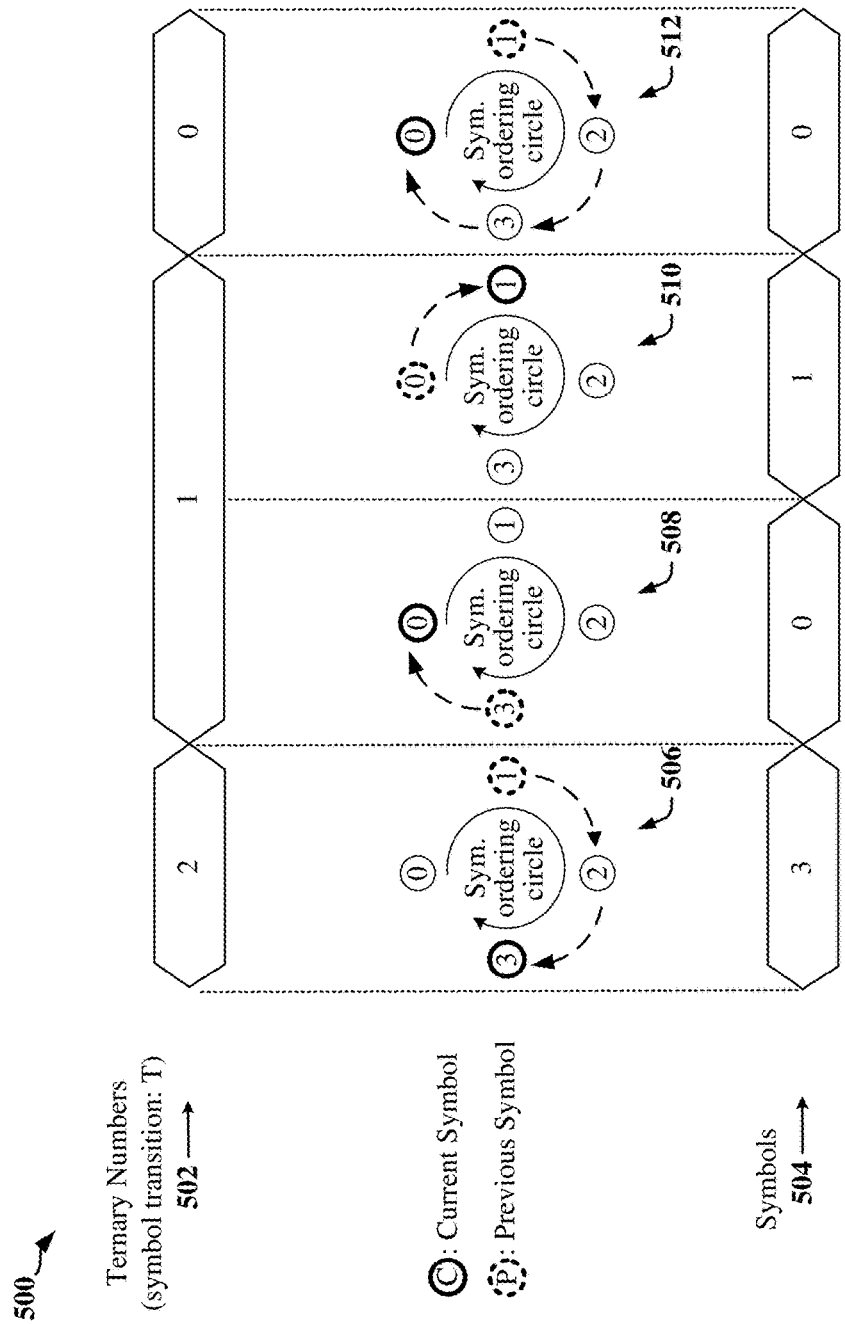
FIG. 5 illustrates one example of converting between transition numbers and a sequence of symbols.

FIG. 5 is a diagram 500 illustrating one example of a scheme for converting between ternary numbers (transition number) 502 and (sequential) symbols 504. A ternary number, base-3 number, also referred to as a transition number, can have one of the 3 possible digits or states, 0, 1, or 2. While the same value may appear in two consecutive ternary numbers, no two consecutive symbols have the same value.

Figure 6:
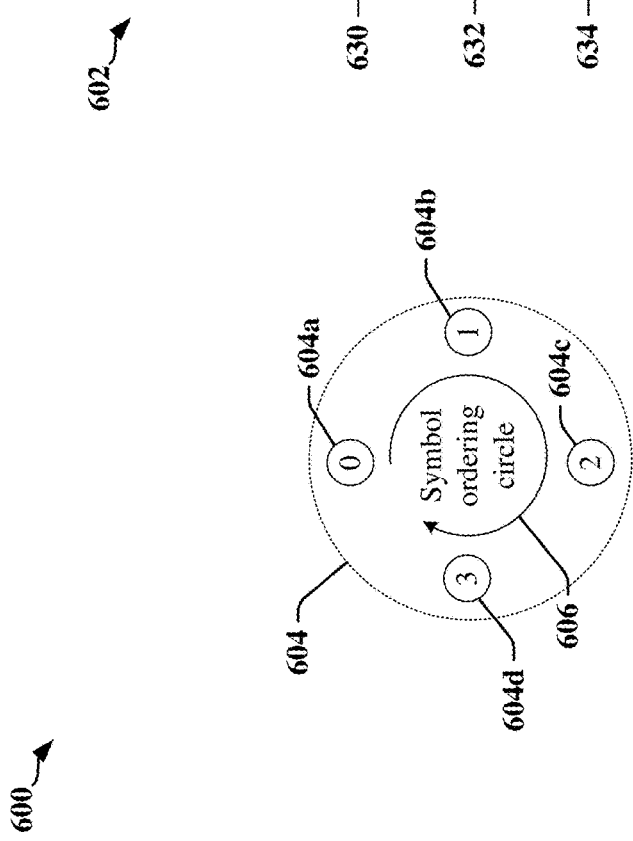
FIG. 6 illustrates an example of a conversion function that may be used to convert between sequential symbols and transition numbers.

The conversion function is set forth illustratively in FIG. 6. On the transmission side (TX: T to S) the logic is $T_{tmp}=T=0$ ? 3: T and $C_s=P_s+T_{tmp}$. In other words, the transition number T is compared to zero and when T=zero, $T_{tmp}$ (T temporary) becomes equal to 3, else (when T not equal zero) $T_{tmp}$ becomes equal to T. And the current symbol ($C_s$) becomes the previous symbol ($P_s$) value plus $T_{tmp}$. For example, in a first cycle 506, the T is 2, so $T_{tmp}$ is also 2, and with $P_s$ being 1, the new $C_s$ is now 3.

In a second cycle 508, the transition number 1 is input in the next cycle, and the transition number is not 3, so T's value of 1 is added to the previous symbol's value of 3. Since the result of the addition, 4, is larger than 3, the rolled over number 0 becomes the current symbol.

In a third cycle 510, the same transition number 1 is input. Because T is 1 $T_{tmp}$ is also 1. The conversion logic adds 1 to the previous symbol 0 to generate current symbol 1.

In a fourth cycle 512, the transition number 0 is input. The conversion logic makes $T_{tmp}$ equal to 3, when T is zero. So 3 is added to the previous symbol 1 to generate current symbol 0 (since the result of the addition, 4, is larger than 3, the rolled over number 0 becomes the current symbol).

Consequently, even if two consecutive ternary digits 502 have the same numbers, this conversion guarantees that two consecutive symbol numbers have different state values. Because of this, the guaranteed symbol transition in the sequence of symbols 504 may serve to embed a clock signal, thereby freeing the clock line SCL in an I2C bus for data transmissions. On the receiver side (RX: S to T) the logic is reversed: $T_{tmp}=C_s+4-P_s$ and $T=T_{tmp}=3$ ? 0: $T_{tmp}$.

Referring again to FIG. 3, at the receiver 320 the process is reversed to convert the transcoded symbols back to bits and, in the process, a clock signal is extracted from the symbol transition. The receiver 320 receives a sequence of sequential symbols 322 over the two wire physical link 302, which may be an I2C bus connected to an SCL line input 324 and a SDA line input 326. The received sequential symbols 322 are input into a clock-data recovery (CDR) block 328 to recover a clock timing and sample the transcoded symbols (S). The CDR 328 may recover a clock signal 336 from the symbol-to-symbol transitions in the received symbols. This recovered clock signal 336 may serve to enable the operation of receiver components and writing of extracted bits without the need for a separate clock. A symbol-to-transition number converter block 330 then converts each symbol to a transition number that may be expressed as a single digit ternary number representative of the difference between a current symbol and immediately preceding symbol. Then, a transition number-to-bits converter 332 converts 12 transition numbers to restore 20 bits 304' of original data from the 12 digit ternary number.

This technique illustrated herein may be used to increase the link rate of a control bus 108 (FIG. 1) beyond what the I2C standard bus provides and is referred hereto as CCIe mode. In one example, a master node and/or a slave node coupled to the control data bus 108 may implement transmitters and/or receivers that embed a clock signal within symbol transmissions (as illustrated in FIGS. 2 and 3) in order to achieve higher bit rates over the same control data bus than is possible using a standard I2C bus. Note that, in other implementations, a different number of data bits may be encoded into the ternary number (base-3 number system) or a number having a different numerical base.

FIG. 6 is a diagram that illustrates the conversion between sequential symbols and transition numbers. This conversion maps each transition from a previous sequential symbol number (Ps) to a current sequential symbol (Cs) to a transition number (T). At the transmitter device, the transition numbers are being converted to sequential symbols. Because of the relative conversion scheme being used, the transition numbers guarantee that no two consecutive sequential symbols 604 will be the same.

In one example for a 2-wire system, there are 4 raw symbols assigned to 4 sequential symbols S0, S1, S2, and S3. For the 4 sequential symbols, Table 602 illustrates how a current sequential symbol (Cs) may be assigned based on a previous sequential symbol (Ps) and a temporary transition number $T_{tmp}$ based upon the current transition number (T).

In this example, the transition number $C_s$ may be assigned according to:

$$Cs=Ps+T_{tmp}$$

where $T_{tmp}=T==0$ ? 3:T.

Alternatively stated, if T is equal to zero, $T_{tmp}$ becomes 3, else $T_{tmp}$ becomes equal to T. And once $T_{tmp}$ is calculated, Cs is set to Ps plus $T_{tmp}$. Moreover, on the receiver end, the logic is reversed to recover T, $$T_{tmp}=C_s+4-P_s \text{ and } T=T_{tmp}-3?0:T_{tmp}.$$

Figure 16:
FIG. 16 illustrates a general example of converting a ternary number (base-3 number) to a binary number, where each transition in $\{T_{11}, T_{10}, \ldots T_2, T_1, T_0\}$ is a symbol transition number.

FIG. 16 includes an equation 1600 that illustrates a general example of converting a ternary number (base-3 number) to a binary number, where each T in {T11, T10, ... T2, T1, T0} is a symbol transition number.

Figure 17:
FIG. 17 illustrates an example of a method for converting a binary number to a 12 digit ternary number.

FIG. 17 includes an equation 1700 that illustrates an exemplary method for converting a binary number (bits) to a 12 digit ternary number (base-3 number). Each digit can be calculated by dividing the remainder (result of a modulo operation) from a higher digit calculation with 3 to the power of the digit number, discarding decimal points numbers.

FIG. 18 is a mathematical representation 1800 that illustrates an example of one possible implementation of the division and the module operations of the FIG. 17, which may be synthesizable by any commercial synthesis tools.

Extracting Data Using an Embedded Receive Clock

Figure 7:
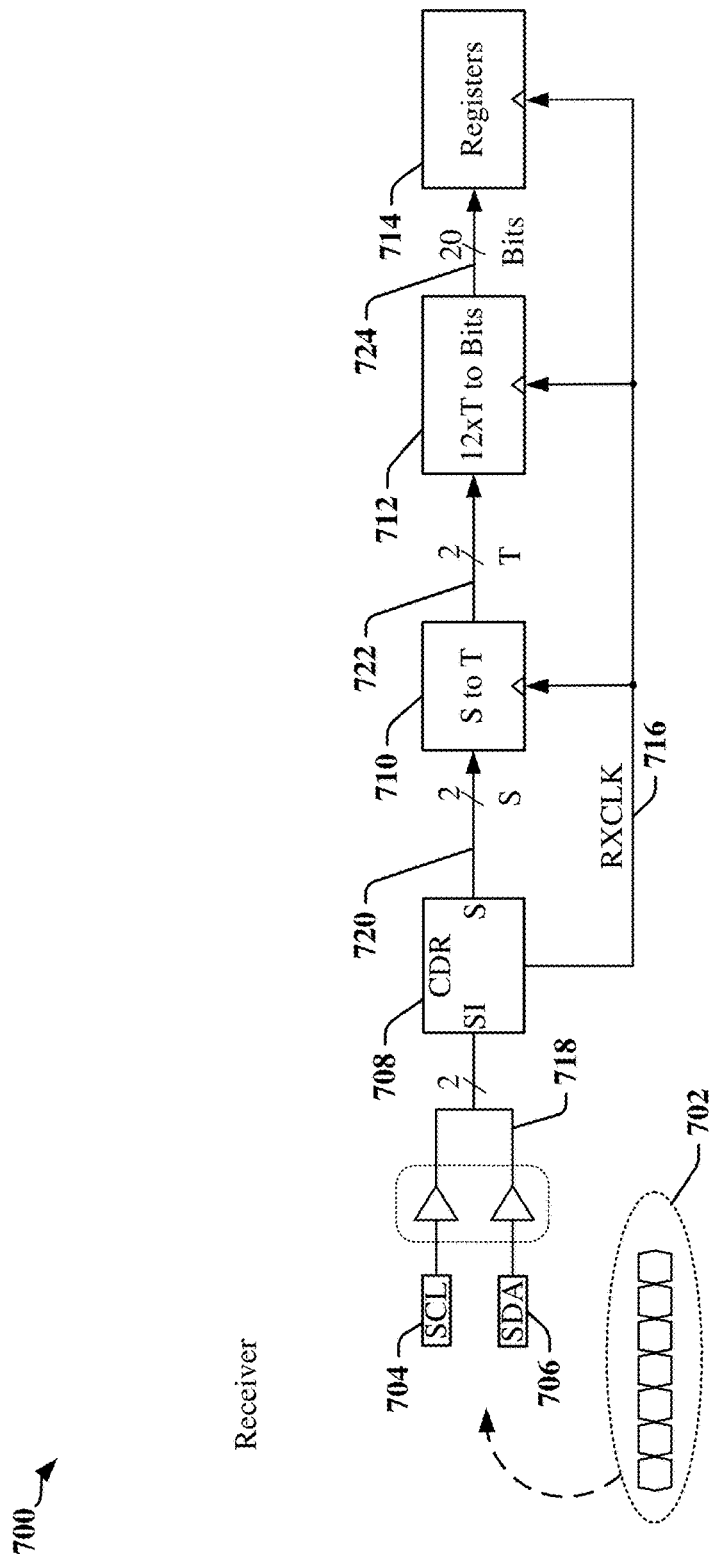
FIG. 7 illustrates a receiver configured to write data decoded from symbols transmitted on a shared bus into registers.

FIG. 7 is a block schematic diagram that illustrates an example of a receiver 700, which may be comparable to the receiver 320 of FIG. 3. The receiver 700 may be configured to extract data 724 from a sequence of symbols 702 received from a shared bus that includes signal wires 704, 706, which may correspond to lines 324 and 326 in FIG. 3. A CDR circuit 708 may provide sampled symbols 720 and a receive clock 716 derived from timing information provided in a multi-bit signal 718 representative of the sequence of symbols 702. The receive clock 716 may also be used provide timing information to decoding logic 710, 712 that extracts data from the sequence of symbols 702.

In some instances, a problem may exist when the receive clock 716 is used to write the extracted data 724 into the registers 714 using only the clock cycles derived from the transitions between symbols in the sequence of symbols 702. The receive clock 716 extracted from symbol-to-symbol transitions within the received transmission 702 may not provide enough clock cycles to decode the data 724 and store the data 724 in the registers 714. An extra clock cycle may be needed after the final symbol-to-symbol transition to write the extracted bits into the registers 714 for storage. In some instances, a free-running clock may be used to provide sufficient clock cycles. The use of a free-running clock may be undesirable because the presence of such free-running clock may require that the master device needs to ensure that the slave device is awake prior to transmission. Under certain conditions, including the conditions discussed in relation to FIG. 8, the extracted clock may be insufficient to extract data from the sequence of symbols 702 and write the data to the registers 714.

Figure 8:
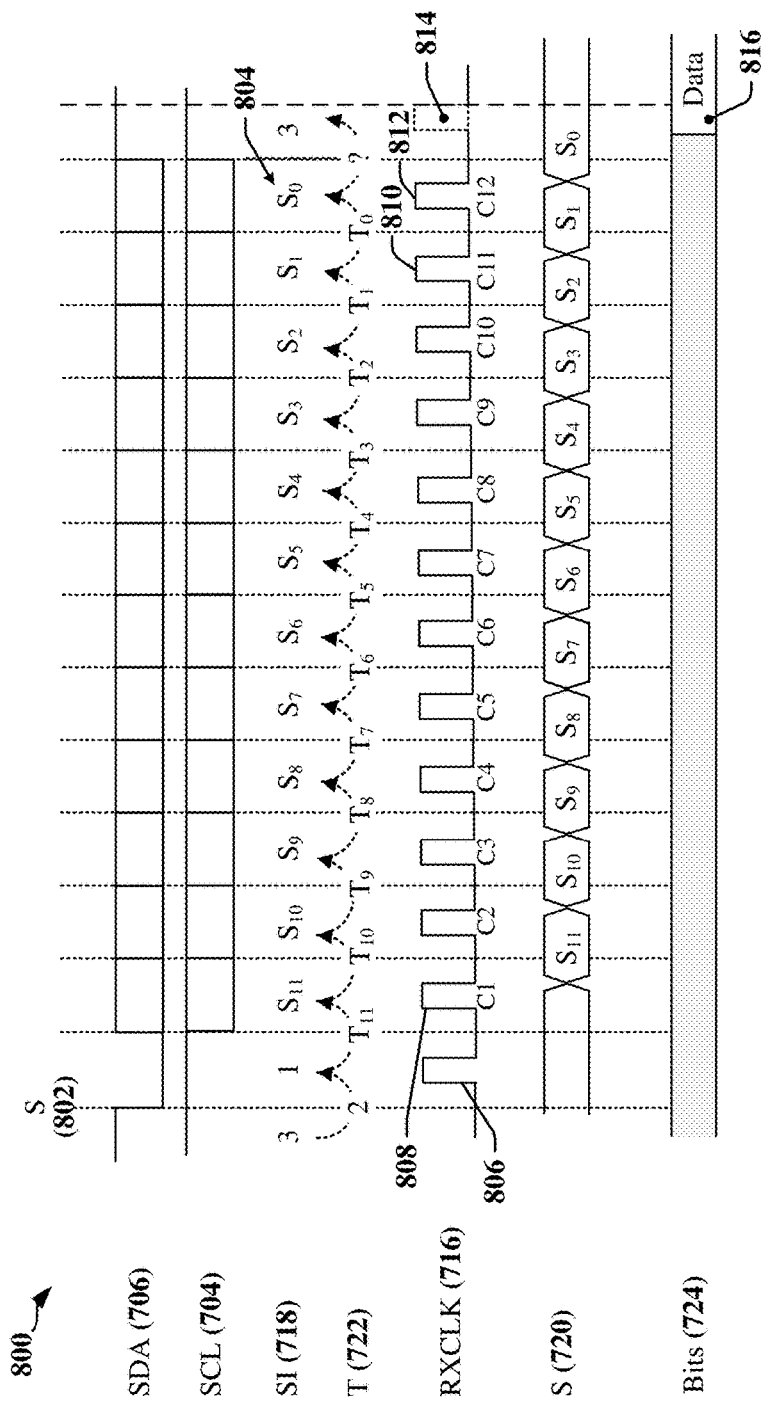
FIG. 8 is a timing diagram corresponding to FIG. 7 and illustrating the decoding of data from symbols, and the recovery of a clock from symbol transitions.

FIG. 8 is a timing diagram 800 illustrating the timing of associated with extracting data encoded within symbols, and the recovery of a clock from the symbol transitions. Preceded by a start indicator (S) 802, a sequence of symbols 702 is transmitted through a two-line bus 704 and 706. The relationship between the SI signal 718, which may be representative of a sequence of symbols 702 and corresponding transitions 722 between symbols is illustrated in the diagram 800. A receiver clock (RXCLK) 716 is extracted from the symbol-to-symbol transitions 722. An initial clock pulse 806 corresponds to the start indicator (S) 802, which may also be referred to as a "Start Condition." A plurality of pulses C1, C2, . . . , C12 on the RXCLK 716 may be extracted from the transitions ($T_{11}$, $T_{10}$, $T_9$ . . . $T_0$) 722 between consecutive symbols $S_{11}$, $S_{10}$, $S_9$, . . . , $S_0$ 718, since no two same sequential symbols repeat. The plurality of pulses may be considered to commence with a first pulse (C1) 808 that corresponds to the first transition between encoded symbols.

After a penultimate clock cycle (C11) 810, and before the last clock cycle (C12) 812 corresponding to a transition between encoded symbols, a final or last symbol ($S_0$) 804 is received and combined with the remaining symbols $S_{11} \ldots S_1$ such that 20 raw data bits 816 may be produced after the last clock cycle (C12) 812 occurs. Note that, it is only after reception of the last symbol (e.g., twelfth symbol $S_0$) that the original bits can be decoded to obtain the raw data bits 816. A last clock cycle 814 is to store the raw data bits 816, or a portion thereof, into the registers 714.

In one example, the number of symbols received is twelve. The twelve symbols may encode twenty bits of information (e.g., including sixteen (16) data bits and four (4) control bits). In other examples, different number of symbols may be used to encode different number of bits.

Figure 9:
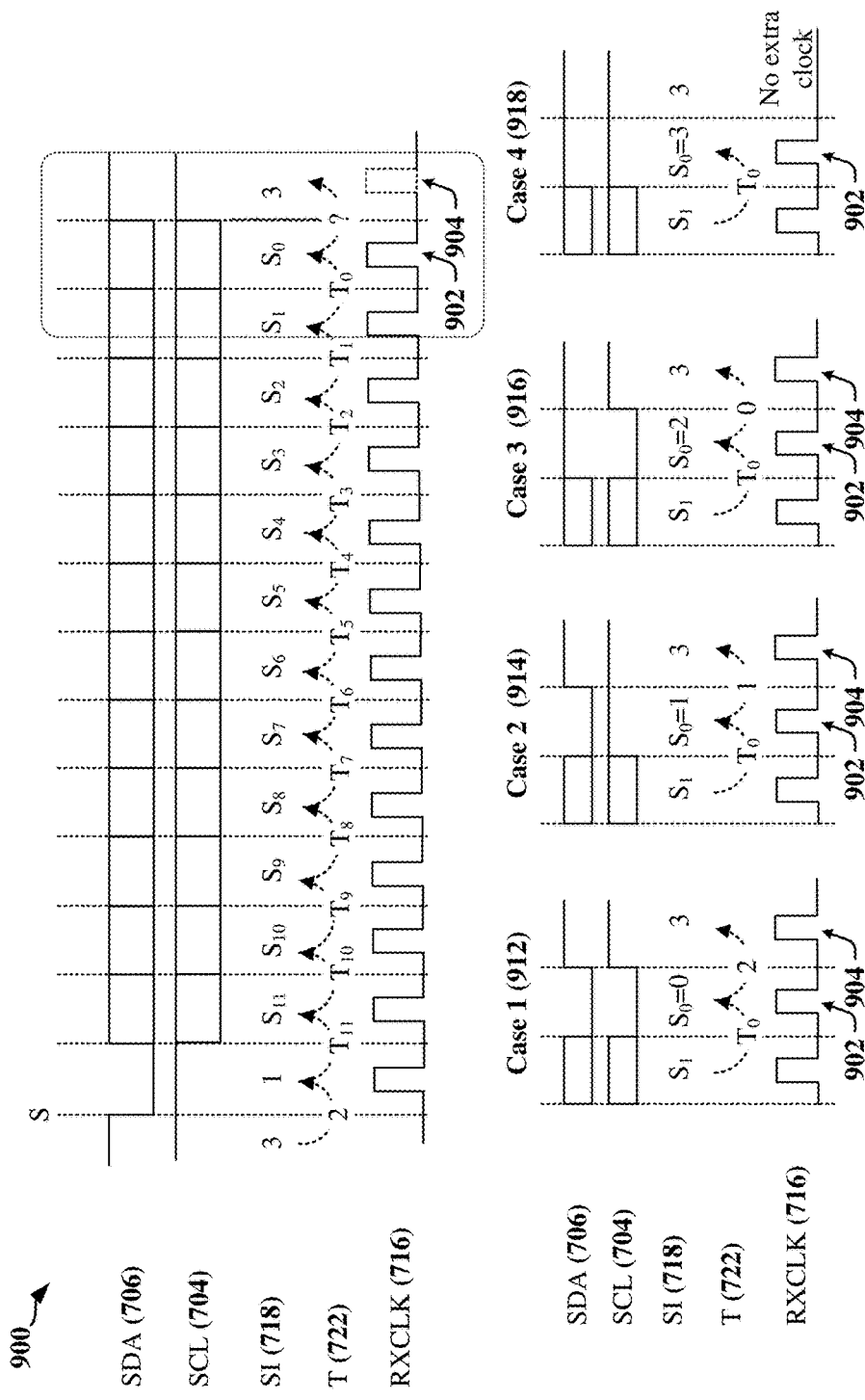
FIG. 9 illustrates certain conditions affecting recovery of a clock from symbol transitions.

FIG. 9 is a drawing 900 that illustrates different recovered clock conditions that correspond to differing signaling states of the two lines 704 and 706 of the serial bus. Four different cases 912, 914, 916, 918 are presented. In each of the four cases 912, 914, 916, 918, a final symbol ($S_0$) is received on the last clock (twelfth) clock pulse 902. The four cases 912, 914, 916, 918 cover the four possible values of the final symbol. In the fourth case 918, the signaling state of the two lines 704 and 706 corresponding to the final symbol is identical to the signaling state of the two lines 704 and 706 during a terminating setup condition. Accordingly, not transition is observed on the signaling state of the two lines 704 and 706 after the symbol period during which the final symbol is transmitted. A thirteenth clock pulse 904 is generated in first three cases 912, 914, 916 and may be used to write received data into registers. A thirteenth clock pulse is absent in the fourth case 918, and the receiver may be prevented from reliably writing the received data into the registers if the receiver relied on the availability of the thirteenth clock pulse 904.

Generating a Guaranteed Register Write Signal

Figure 10:
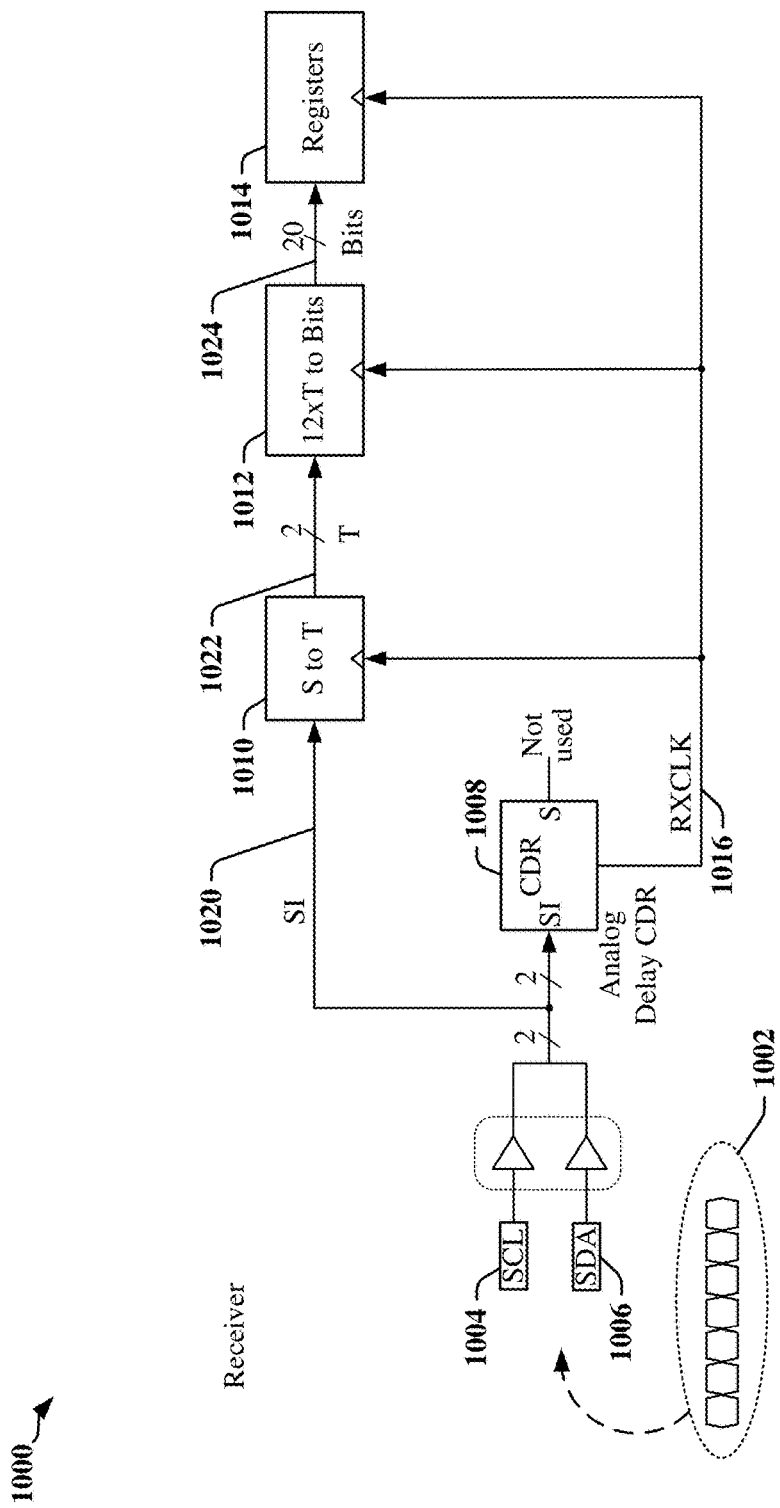
FIG. 10 illustrates a receiver configured to write data decoded from transmissions of shared bus into registers using only a clock recovered from symbol transitions and without a free-running clock.
Figure 11:
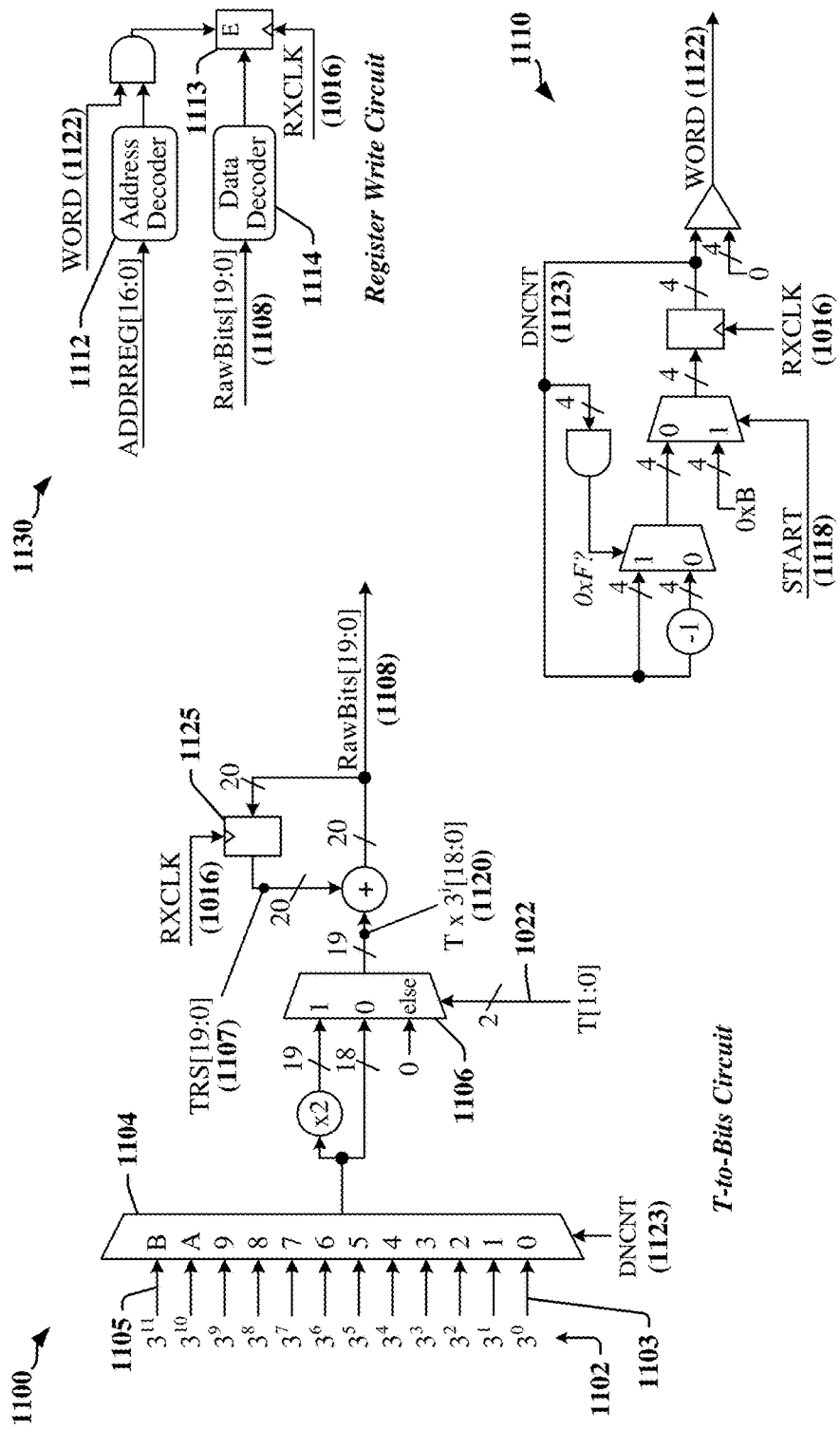
FIG. 11 illustrates circuits of a receiver that may be configured to convert a twelve digit ternary number into bits and to perform a register write operation using only a clock recovered from symbol transitions and without a free-running clock.
Figure 12:
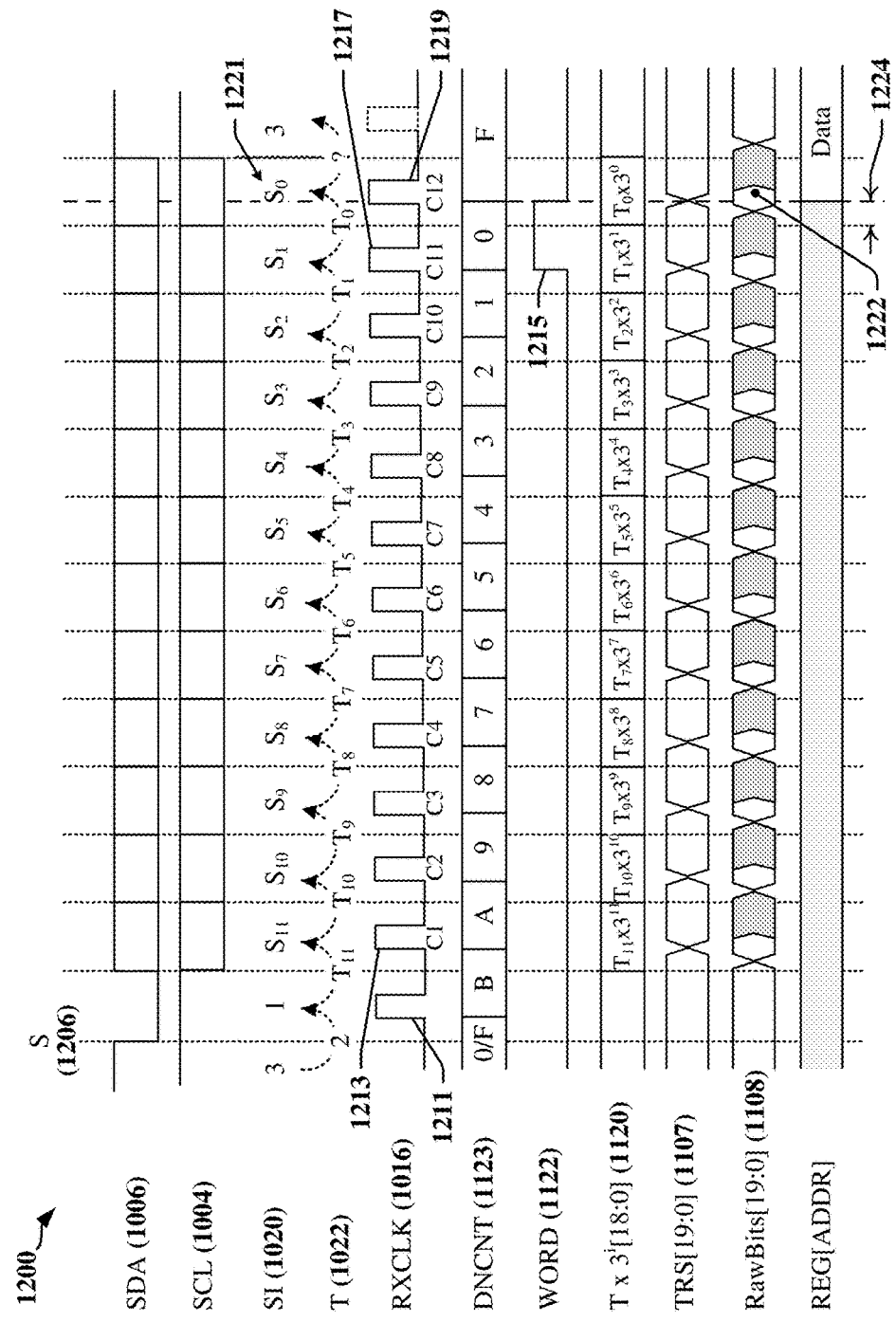
FIG. 12 is a timing diagram illustrating the operation of the receiver and circuits illustrated in FIGS. 10 and 11.

According to certain aspects disclosed herein, and as illustrated by FIGS. 10-12, a word marker may be generated to enable data decoded from a sequence of symbols to be reliably written to registers in a CCIe receiver. FIG. 10 is a block schematic diagram that illustrates an example of a receiver 1000, which may be adapted using circuits 1100, 1110, and/or 1130 of FIG. 11 to decode data from the SI signal 1020. A timing diagram 1200 provided in FIG. 12 illustrates the operation of the receiver 1000 and circuits 1100, 1110, 1130. The SI signal 1020 may be processed by a combination of the S-to-T decoder 1010, the T-to-Bits decoder 1012 and, in some instances, a register data decoder 1114 before the sampling edge of the RXCLK 1016 occurs. Accordingly, an addressed register 1113 performs the sampling related to the signals received from the serial bus, and the sampling is performed on decoded data.

The receiver 1000 may be configured to extract data from a sequence of symbols 1002 received from a shared bus that includes signal wires 1004, 1006, which may correspond to lines 324 and 326 in FIG. 3. The data may be written to registers 1014 using a receive clock 1016 recovered from the received data by a CDR circuit 1008. A free-running clock is not required. The receive clock (RXCLK) 1016 may also be used provide timing information to decoding logic 1010, 1012 that extracts data from the sequence of symbols 1002. In this circuit, the symbols-to-transition number convertor 1010 receives and processes the SI signal 1020.

The receiver 1000 may employ one or more counters to maintain an index to transition number position (DNCNT) 1123 and to produce a word marker that consistently permits writing received data 1024 to the registers 1014, including in the fourth case 918 illustrated in FIG. 9. A register write operation may be performed on the last recovered clock RXCLK 1016 cycle without the need for a free-running clock or other additional clock on a slave device, and without the need to insert unused/padding bits solely for the purpose of making an extra clock cycle available With continued reference to FIG. 10, certain circuits 1100, 1110, 1130 illustrated in FIG. 11 may be adapted or configured to convert a twelve digit ternary number into bits, and to perform a register write operation of extracted bits using only a clock 1016 recovered from the transmission corresponding to the ternary number. Referring back to FIG. 3, original data of twenty bits (i.e., data bits 304) is converted into a ternary transition number, then this transition number is converted (i.e., transcoded) to twelve sequential symbols 316. The transcoded symbols 316 are transmitted on the bus 302. A receiving device 320 (e.g., a slave device) receives the transcoded symbols 316 and performs clock recovery and symbol sampling to convert the transcoded symbols 316 back to a ternary number which is then supplied to one or more circuits such as the converter circuit 332, which converts the ternary number back to the original twenty bit binary data.

A first circuit 1100 may be adapted to extract twenty (20) raw bits 1108 from twelve (12) transition numbers. Ternary weights 1102 are selected using DNCNT 1123, to control the multiplexer 1104, where DNCNT 1123 represents transition number position. The twelve transition numbers may be processed in an order determined based on their corresponding position in a sequence of transition numbers (e.g. in a sequence related to time of arrival), which may be indicated by the value of DNCNT 1123, which may be provided by a counter, register, or other index circuitry. The ternary weights 1102 are provided as inputs to a single output multiplexer 1104 that is used to serialize the ternary weights 1102 such that the twenty raw bits 1108 can be extracted. The twenty raw bits 1108 may include sixteen (16) data bits and four (4) control bits. A second multiplexer 1106 functions as a multiplier for a $T_i \times 3^i$ operation and is triggered and/or controlled by a signal 1022 representative of the 2-bit output from the symbol-to-ternary block 1010 of FIG. 10. A first flip-flop 1125, triggered by RXCLK 1016, is used to accumulate the transitory bits as the ternary number is decoded or converted from the ternary weights 1102 to the raw bits 1108. Note that the occurrence of the last symbol ($S_0$) 1221 (see FIG. 12), which is received after the penultimate clock pulse (C11) 1217, triggers the first flip flop 1125 to output the collected transitory bits to be added to the bits from the last ternary weight 1103 output by a second multiplexer 1106. Consequently, the raw bits 1108 (e.g., data 1024 in FIG. 10) hold valid value and are available after the last symbol $S_0$ 1221 is input after the penultimate clock cycle (C11) 1217 but before the last clock cycle (C12) 1219.

A second circuit 1110 may serve to obtain a word marker 1122 when all symbols are received. Upon detecting a start indicator 1118 of the receiver clock 1120, the value (DNCNT) 1123 of a down counter decreases with each pulse on the RXCLK 1016 from 0xB hex to zero (0x0 hex) at the penultimate clock (C11) 1217, and then to 0xF hex at the last clock (C12) 1219. A pulse 1215 on the word marker 1122 is triggered when the down counter reaches 0x0 hex. The word marker 1122 serves as input to a third circuit 1130 to enable writing data bits into registers. Note that DNCNT 1123 also serves to select an input signal from the multiplexer 1104, starting with input "B" (first ternary weight 1105) and counting down to input "0" (last ternary weight 1103).

The third circuit 1130 illustrates an example of a circuit configured to write the decoded bits into a second flip-flop or registers 1113. An address decoder 1112 receives seventeen (17) bits of address information and decodes it. Similarly, a data decoder 1114 receives the twenty (20) raw bits 1108 and decodes them to obtain, for example, sixteen (16) data bits after four control bits have been removed. When the pulse 1215 of the word marker 1122 is triggered and the address is decoded, the decoded data provided by the data decoder 1114 may be stored in the flip-flops or register 1113. This third circuit 1130 effectively uses the word marker 1122 to trigger a write to the second flip-flop or registers 1113 on the last clock cycle (C12) 1219.

On the penultimate clock cycle (C11) 1217, DNCNT 1123 has been decremented from 0xB hex to 0x0 hex, and the word marker 1122 transitions from logic low to logic high (i.e., the start of the pulse 1215). At the last clock cycle (C12) 1219, the second flip flop or register 1113 is enabled and stores the 16-bit bus now carrying the decoded data bits.

This approach permits storing the received data bits into flip-flops or registers 1113 without a running clock on the slave device. Consequently, the slave device can go into a sleep mode without notifying the master device. That is, no separate mechanism is needed for a master device to be informed when a slave device goes into a sleep mode (e.g., no "slave sleep request" is necessary from a slave device). Because the embedded clock allows the slave device to receive the transmitted bits and the third circuit 1130 generates an additional clock without the need for the slave device to be awake, a master device can write data to a slave device register even when the slave device is asleep or in a sleep mode (e.g., without the need for a free-running clock). In some implementations, the slave device may use the written register data to conditionally wake up part or all its functionality. Therefore, the master device does not have to know whether the slave device is awake or sleeping before sending or writing data to the slave device. Additionally, the slave device may independently enter into a sleep mode without notifying the master device.

The timing diagram 1200 of FIG. 12 illustrates the reception of data encoded within symbols, the recovery of a clock from the symbol transitions, as well as a timing of generated signals used to complete a write operation of the received data to registers using only the recovered clock. Preceded by a start indicator (S) 1206, a sequence of symbols in the SI signal 1020 is transmitted through a two-line bus 1004, 1006. The sequence of symbols 1020 and corresponding transitions between symbols is illustrated. A receiver clock 1016 is extracted from the symbol-to-symbol transitions in the signal 1022 representative of the 2-bit output from the symbol-to-ternary block 1010 of FIG. 10. An initial clock pulse 1211 corresponds to the start indicator or start condition, such as the start condition described in the I2C Specification. A plurality of clock pulses C1, C2, . . . , C12 may be extracted from the transitions ($T_{11}$, $T_{10}$, $T_9$ . . . $T_0$) between consecutive symbols $S_{11}$, $S_{10}$, $S_9$, . . . , $S_0$ since no two same sequential symbols repeat.

In this example, DNCNT 1123 is used for counting down twelve (12) cycles, each corresponding to a cycle from a low-to-high transition to a low-to-high transition of the receiver clock RXCLK 1016. DNCNT 1123 is decremented after the first clock cycle 1213 is detected, and until a last cycle 1219 is detected. When the DNCNT 1123 reaches 0x0 hex, a pulse 1215 is triggered on the word marker 1122.

After a penultimate clock cycle (C11) 1217 and before the last clock cycle (C12) 1219, a final or last symbol ($S_0$) 1221 is received and combined with the remaining symbols $S_{11}$ . . . $S_1$ so that the raw data bits 1108 are available when the last clock cycle C12 1219 occurs. Note that, it is after reception of the last symbol (e.g., twelfth symbol $S_0$) that the original bits can be decoded to obtain the raw data bits 1108. A last clock cycle 1219 is then used to store the raw data bits 1108, or a portion thereof, into the registers 1113. This allows receiving, decoding, and storing the data 1222 solely using the embedded clock (e.g., clock recovered from symbol-to-symbol transitions) and without use of an external or free-running clock at the receiver (slave) device. Note that this is achieved without the need to pad or insert extra symbols or bits. In one example, the number of symbols received is twelve. The twelve symbols may encode twenty bits of information (e.g., including sixteen (16) data bits and four (4) control bits). In other examples, different number of symbols may be used to encode different number of bits.

Figure 13:
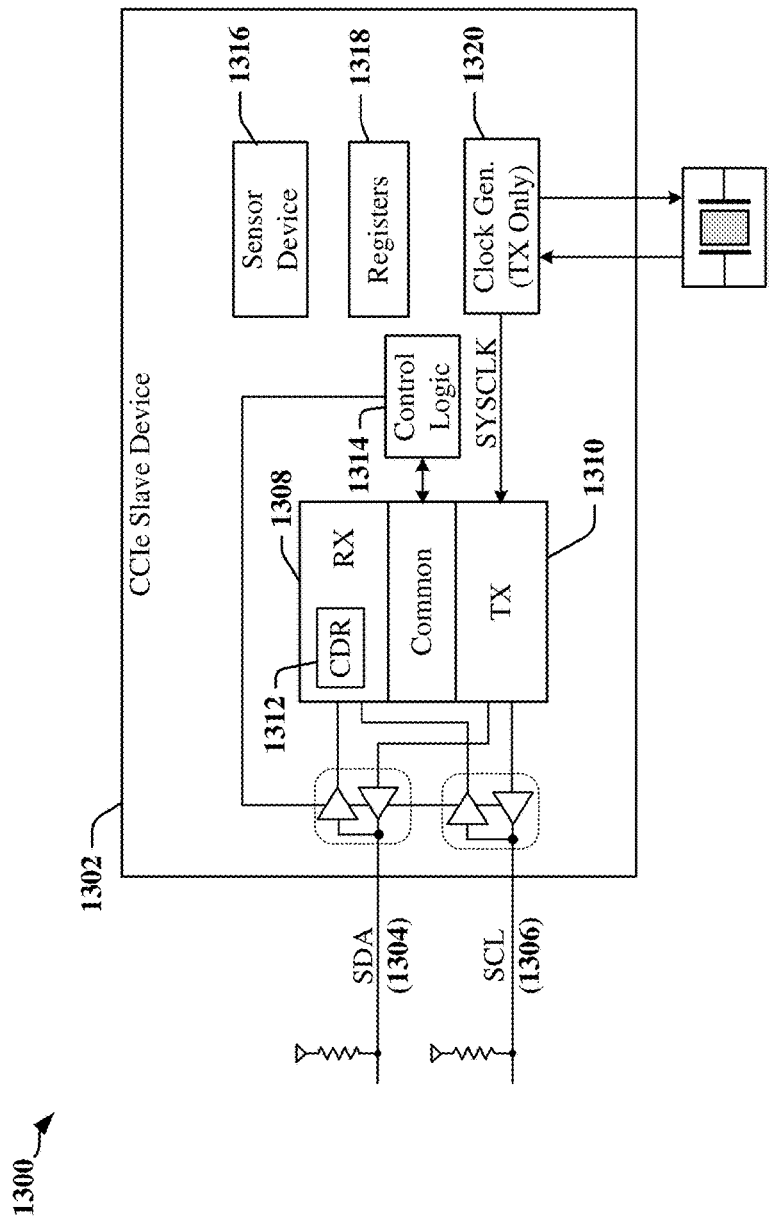
FIG. 13 illustrates an example of a CCIe slave device configured to receive a transmission from a shared bus by using a clock extracted from the received transmission and writing data from the transmission without the need for the slave device to be awake.

FIG. 13 is a block diagram 1300 that illustrates an example of a CCIe slave device 1302 that may be configured to receive a transmission from a shared bus by using a clock extracted from the received transmission and writing data from the transmission without the need for the slave device to be awake. The slave device 1302 includes a receiver circuit 1308 and a transmitter circuit 1310 coupled to a shared bus 1304 and 1306. A control logic 1314 may serve to selectively activate/deactivate the receiver circuit 1308 and/or transmitter circuit 1310 so that the slave device receives or transmits over the shared bus 1304 and 1306. The slave device 1302 may also include a sensor device that captures or collects information for transmission from the slave device.

The receiver circuit 1308 may include a clock data recovery circuit 1312 may extract a receiver clock (RXCLK) from symbol-to-symbol transitions according to certain aspects disclosed herein. The receiver circuit 1308 may also include one or more of the first circuit 1100, second circuit 1110, and/or third circuit 1130 (FIG. 11) to decode and extract data received over the shared bus and store such data in registers 1318 using only the extracted clock from the received data transmission and without introducing delays of the extracted clock. Note that the first circuit 1100, second circuit 1110, and/or third circuit 1130 (FIG. 11) may be integrated into one circuit or distributed among different modules or sub-systems.

A clock generator 1320 may be present within the slave device 1302, but it is used only for transmission of data from the slave device and/or other slave device operation, e.g. motion detection or temperature measurement by sensor devices.

Figure 14:
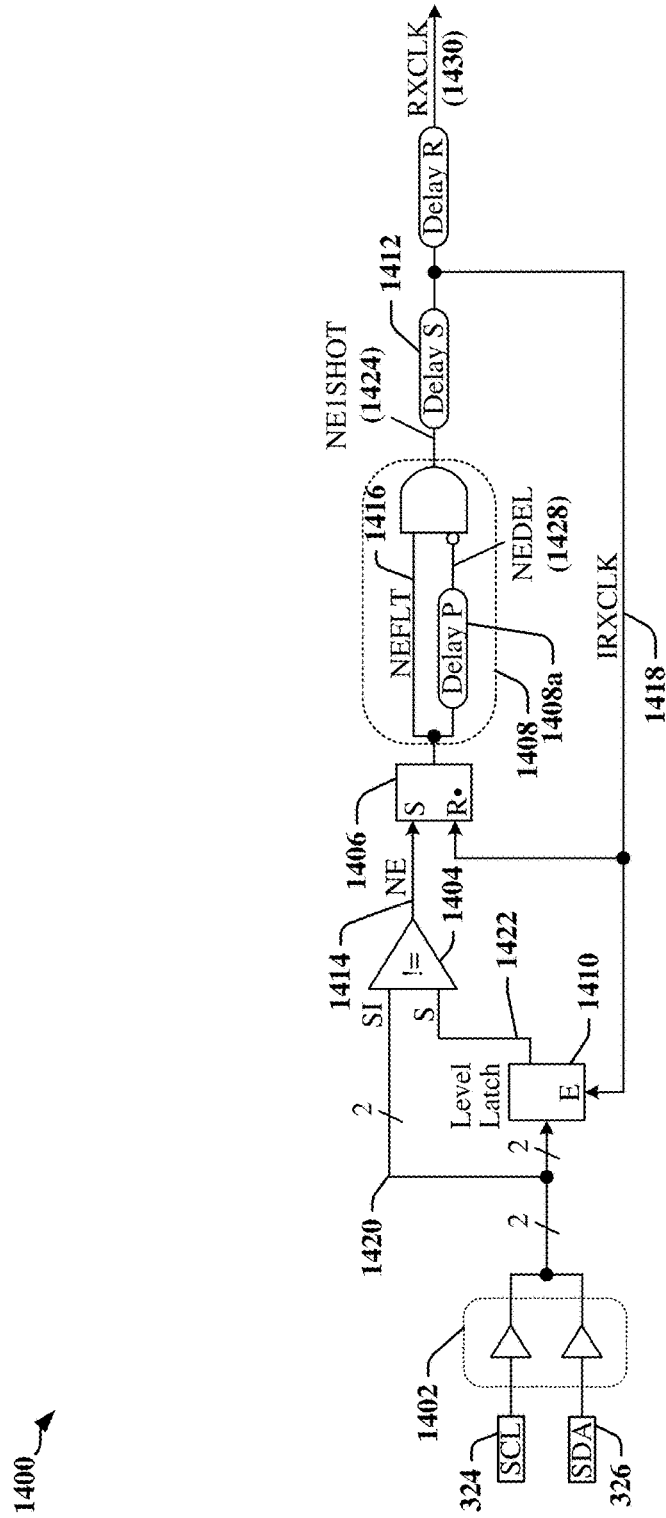
FIG. 14 illustrates an example of a clock recovery circuit according to one or more aspects disclosed herein.
Figure 15:
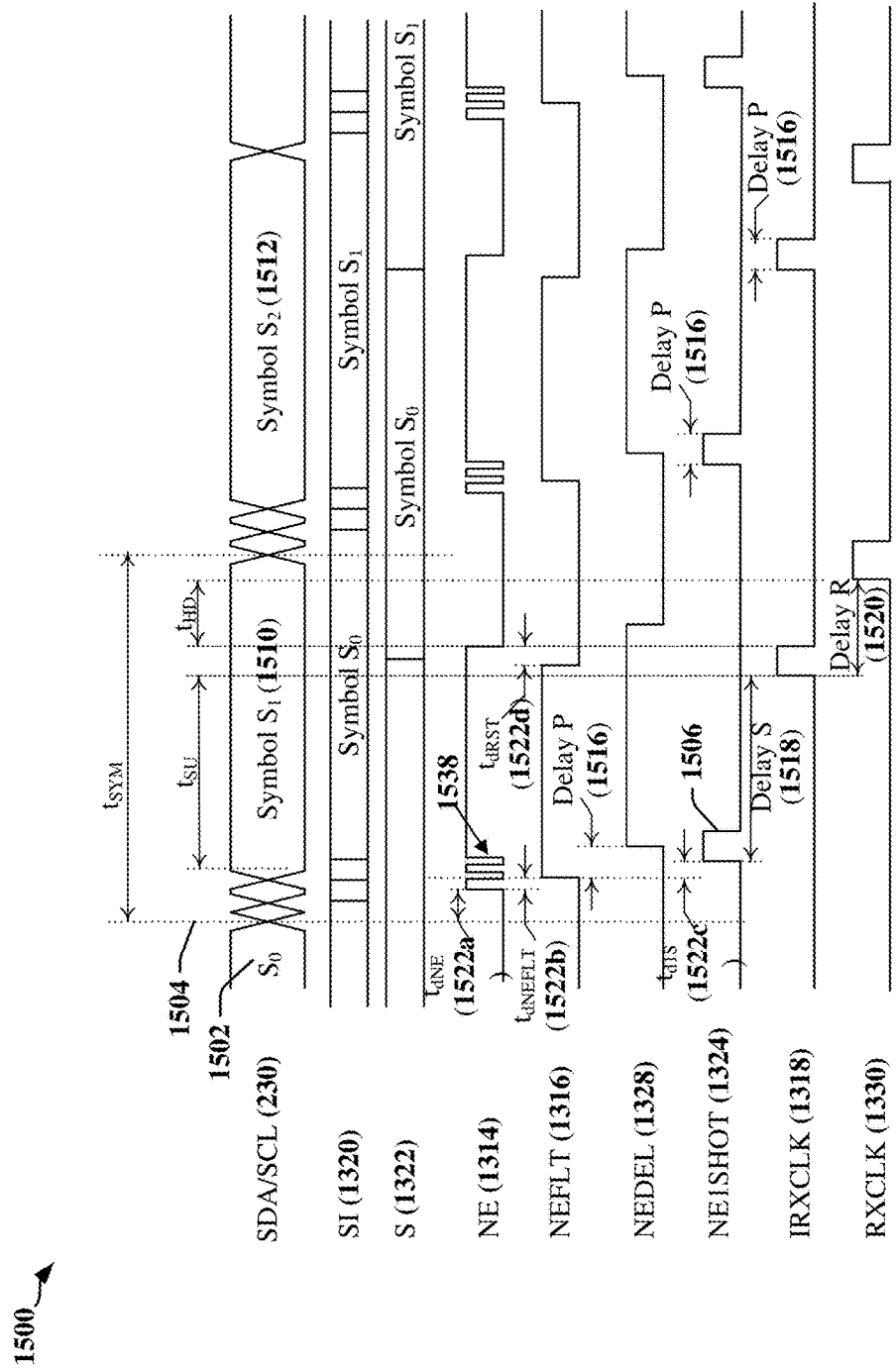
FIG. 15 shows an example of timing of certain signals generated by the exemplary clock recovery circuit of FIG. 14.

FIG. 14 illustrates an example of a CDR circuit 1400 according to one or more aspects disclosed herein and FIG. 15 shows an example of timing of certain signals generated by the CDR circuit 1400. The CDR circuit 1400 may be used in a CCIe transmission scheme where clock information is embedded in transmitted sequences of symbols. The CDR circuit 1400 may be used as the CDR 328 (FIG. 3) or CDR 1312 (FIG. 13). The CDR circuit 1400 includes analog delay elements 1408a, 1412 and 1426, which are configured to maximize set up time for symbols 1510, 1512 received from a CCIe two-line bus 324 & 326. The CDR circuit 1400 includes a comparator 1404, a set-reset latch 1406, a one-shot element 1408 including first delay element 1408a, a second analog delay element 1412, a third analog delay element 1426 and a level latch 1410. The comparator 1404 may compare an input signal (SI) 1420 that includes a stream of symbols 1510 and 1512 with a signal (S) 1422 that is a level-latched instance of the SI signal 1420. The comparator outputs a comparison signal (NE) 1414. The set-reset latch 1406 receives the NE comparison signal 1414 from the comparator 1404 and outputs a filtered version of the comparison signal (NEFLT) 1416. The first analog delay device 1408a may receive the filtered version of the NEFLT signal 1416 and outputs a signal (NEDEL signal) 1428 that is a delayed instance of the NEFLT signal 1416. In operation, the one-shot logic 1408 receives the NEFLT signal 1416 and the delayed NEDEL signal 1428 and outputs a signal (NE1SHOT) 1424 that includes a pulse 1506 that is triggered by the NEFLT signal 1416.

The second analog delay device 1412 receives the NE1SHOT signal 1424 and outputs the IRXCLK signal 1418, where the IRXCLK signal 1418 may be used to generate an output clock signal 1430 using the third analog delay element 1426. The output clock signal 1430 may be used for decoding the latched symbols in the S signal 1422. The set-reset latch 1406 may be reset based on the state of the IRXCLK signal 1418. The level latch 1410 receives the SI signal 1420 and outputs the level-latched S signal 1422, where the level latch 1410 is enabled by the IRXCLK signal 1418.

When a first symbol value $S_1$ 1510 is being received, it causes the SI signal 1420 to commence changing its state. The state of the SI signal 1420 may be different from the state associated with the $S_1$ symbol 1510 due to the possibility that intermediate or indeterminate states may occur at the signal transition from the previous symbol $S_0$ 1502 to the first symbol $S_1$ 1510 due to inter-wire skew, signal overshoot, signal undershoot, crosstalk, and so on. The NE signal 1414 transitions high when the comparator 1404 detects different value between the SI signal 1420 and the S signal 1422, causing the set-reset latch 1406 to be asynchronously set. Accordingly, the NEFLT signal 1416 transitions high, and this high state is maintained until the set-reset latch 1406 is reset when IRXCLK 1418 becomes high. The IRXCLK 1418 transitions to a high state in delayed response to the rising of the NEFLT signal 1416, where the delay is attributable in part to the analog delay element 1412.

The intermediate states on the SI signal 1420 may be regarded as invalid data and may include a short period of symbol value of the symbol $S_0$ 1502, and these intermediate states may cause spikes or transitions 1538 in the NE signal 1414 as the output of the comparator 1404 returns towards a low state for short periods of time. The spikes 1538 do not affect NEFLT signal 1416 output by the set-reset latch 1406, because the set-reset latch 1406 effectively blocks and/or filters out the spikes 1538 on the NE signal 1414 before outputting the NEFLT signal 1416.

The one-shot circuit 1408 outputs a high state in the NE1SHOT signal 1424 after the rising edge of the NEFLT signal 1416. The one-shot circuit 1408 maintains the NE1SHOT signal 1424 at a high state for the delay P period 1516 before the NE1SHOT signal 1424 returns to the low state. The resultant pulse 1506 on the NE1SHOT signal 1424 propagates to the IRXCLK signal 1418 after the delay S period 1518 caused by the analog delay S element 1412. The high state of the IRXCLK signal 1418 resets the set-reset latch 1406, and the NEFLT signal 1416 transitions low. The high state of IRXCLK signal 1418 also enables the level latch 1410 and the value of the SI signal 1420 is output as the S signal 1422.

The comparator 1404 detects when the S signal 1422 corresponding to the $S_1$ symbol 1510 matches the symbol $S_1$ symbol 1510 of the SI signal 1420, and the output of the comparator 1404 drives the NE signal 1414 low. The trailing edge of the pulse 1540 on the NE1SHOT signal 1424 propagates to the IRXCLK signal 1418 after the delay S period 1518 caused by the analog delay S element 1412.

When a new symbol $S_2$ 1512 is being received, the SI signal 1420 begins its transition to the value corresponding to the symbol $S_2$ 1512 after the trailing edge of the IRXCLK signal 1418.

In one example, the output clock signal RXCLK 1430 is delayed by a Delay R period 1520 by the third analog delay element 1426. The output clock signal 1430 and the S signal 1422 (data) may be provided to the decoding circuits 1100, 1110, and/or 1130 (FIG. 11). The decoding circuits 1100, 1110, and/or 1130 (FIG. 11) may sample the symbols on the S signal 1422 using the output clock signal 1430 or a derivative signal thereof.

In the example depicted, various delays 1522a-1522d may be attributable to switching times of various circuits and/or rise times attributable to connectors. In order to provide adequate setup times for symbol capture by a decoding circuit, the timing constraint for the symbol cycle period $t_{SYM}$ may be defined as follows:

$$t_{dNE}+t_{dNEFLT}+t_{d1S}+\text{Delay } S+\text{Delay } P+\max(t_{HD},t_{REC}-t_{dNE})<t_{SYM}$$

and the timing constraint for the setup time $t_{su}$ may be as follows:

$$\text{Max skew spec}+t_{SU}<t\text{dNE}+t\text{d1}S+\text{Delay } S$$

where:
$t_{sym}$: one symbol cycle period,
$t_{SU}$: setup time of SI 1420 for the level latches 1410 referenced to the rising (leading) edge of IRXCLK 1418,
$t_{HD}$: hold time of SI 1420 for the level latches 1410 referenced to the falling (trailing) edge of IRXCLK 1418,
$t_{dNE}$: propagation delay of the comparator 1404,
$t_{dRST}$: reset time of the set-reset latch 1406 from the rising (leading) edge of IRXCLK 1418.

The CDR circuit 1400 employs analog delay circuits 1408a, 1412 and 1426 to ensure that a receiver device (e.g., slave device 1302) may decode CCIe encoded symbols and store the resulting bits into registers without using a free-running system clock. Accordingly, a CCIe slave device 1302 (see FIG. 13) may be adapted to use a transmit clock 1320 as a system clock when responding to a CCIe READ command, and the CDR generated clock 1430 may be used when receiving data or when the slave device is asleep.

Figure 19:
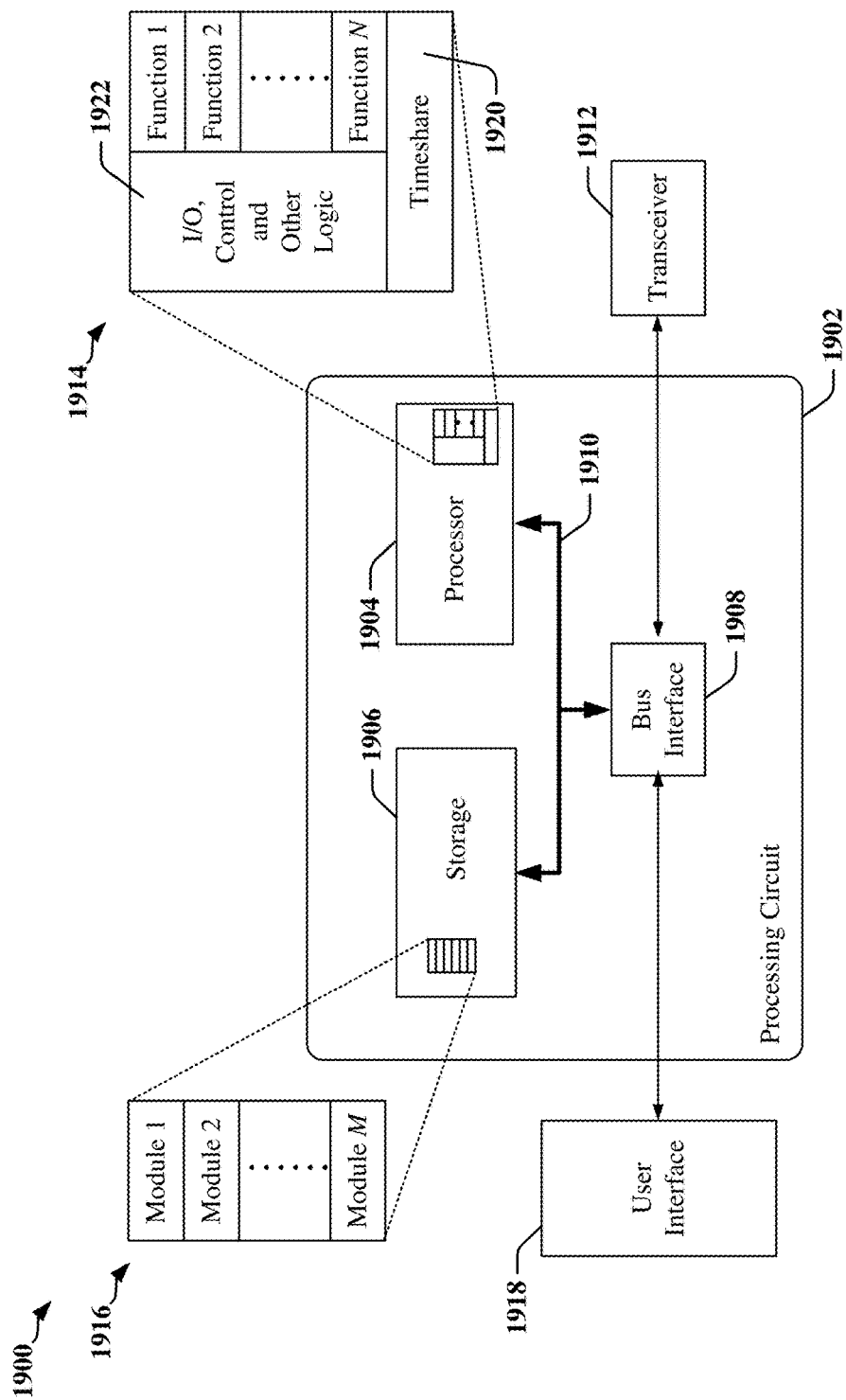
FIG. 19 is a block diagram illustrating an example of an apparatus employing a processing circuit that may be adapted according to certain aspects disclosed herein.

FIG. 19 is a conceptual diagram 1900 illustrating a simplified example of a hardware implementation for an apparatus employing a processing circuit 1902 that may be configured to perform one or more functions disclosed herein. In accordance with various aspects of the disclosure, an element, or any portion of an element, or any combination of elements as disclosed herein may be implemented using the processing circuit 1902. The processing circuit 1902 may include one or more processors 1904 that are controlled by some combination of hardware and software modules. Examples of processors 1904 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1904 may include specialized processors that perform specific functions, and that may be configured, augmented or controlled by one of the software modules 1916. The one or more processors 1904 may be configured through a combination of software modules 1916 loaded during initialization, and further configured by loading or unloading one or more software modules 1916 during operation.

In the illustrated example, the processing circuit 1902 may be implemented with a bus architecture, represented generally by the bus 1910. The bus 1910 may include any number of interconnecting buses and bridges depending on the specific application of the processing circuit 1902 and the overall design constraints. The bus 1910 links together various circuits including the one or more processors 1904, and storage 1906. Storage 1906 may include memory devices and mass storage devices, and may be referred to herein as computer-readable media and/or processor-readable media. The bus 1910 may also link various other circuits such as timing sources, timers, peripherals, voltage regulators, and power management circuits. A bus interface 1908 may provide an interface between the bus 1910 and one or more transceivers 1912. A transceiver 1912 may be provided for each networking technology supported by the processing circuit. In some instances, multiple networking technologies may share some or all of the circuitry or processing modules found in a transceiver 1912. Each transceiver 1912 provides a means for communicating with various other apparatus over a transmission medium. Depending upon the nature of the apparatus, a user interface 1918 (e.g., keypad, display, speaker, microphone, joystick) may also be provided, and may be communicatively coupled to the bus 1910 directly or through the bus interface 1908.

A processor 1904 may be responsible for managing the bus 1910 and for general processing that may include the execution of software stored in a computer-readable medium that may include the storage 1906. In this respect, the processing circuit 1902, including the processor 1904, may be used to implement any of the methods, functions and techniques disclosed herein. The storage 1906 may be used for storing data that is manipulated by the processor 1904 when executing software, and the software may be configured to implement any one of the methods disclosed herein.

One or more processors 1904 in the processing circuit 1902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1906 or in an external computer readable medium. The external computer-readable medium and/or storage 1906 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1906 may also include, by way of example, a carrier wave, a transmission line, and any other suitable medium for transmitting software and/or instructions that may be accessed and read by a computer. Computer-readable medium and/or the storage 1906 may reside in the processing circuit 1902, in the processor 1904, external to the processing circuit 1902, or be distributed across multiple entities including the processing circuit 1902. The computer-readable medium and/or storage 1906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1906 may maintain software maintained and/or organized in loadable code segments, modules, applications, programs, etc., which may be referred to herein as software modules 1916. Each of the software modules 1916 may include instructions and data that, when installed or loaded on the processing circuit 1902 and executed by the one or more processors 1904, contribute to a run-time image 1914 that controls the operation of the one or more processors 1904. When executed, certain instructions may cause the processing circuit 1902 to perform functions in accordance with certain methods, algorithms and processes described herein.

Some of the software modules 1916 may be loaded during initialization of the processing circuit 1902, and these software modules 1916 may configure the processing circuit 1902 to enable performance of the various functions disclosed herein. For example, some software modules 1916 may configure internal devices and/or logic circuits 1922 of the processor 1904, and may manage access to external devices such as the transceiver 1912, the bus interface 1908, the user interface 1918, timers, mathematical coprocessors, and so on. The software modules 1916 may include a control program and/or an operating system that interacts with interrupt handlers and device drivers, and that controls access to various resources provided by the processing circuit 1902. The resources may include memory, processing time, access to the transceiver 1912, the user interface 1918, and so on.

One or more processors 1904 of the processing circuit 1902 may be multifunctional, whereby some of the software modules 1916 are loaded and configured to perform different functions or different instances of the same function. The one or more processors 1904 may additionally be adapted to manage background tasks initiated in response to inputs from the user interface 1918, the transceiver 1912, and device drivers, for example. To support the performance of multiple functions, the one or more processors 1904 may be configured to provide a multitasking environment, whereby each of a plurality of functions is implemented as a set of tasks serviced by the one or more processors 1904 as needed or desired. In one example, the multitasking environment may be implemented using a timesharing program 1920 that passes control of a processor 1904 between different tasks, whereby each task returns control of the one or more processors 1904 to the timesharing program 1920 upon completion of any outstanding operations and/or in response to an input such as an interrupt. When a task has control of the one or more processors 1904, the processing circuit is effectively specialized for the purposes addressed by the function associated with the controlling task. The timesharing program 1920 may include an operating system, a main loop that transfers control on a round-robin basis, a function that allocates control of the one or more processors 1904 in accordance with a prioritization of the functions, and/or an interrupt driven main loop that responds to external events by providing control of the one or more processors 1904 to a handling function.

Figure 20:
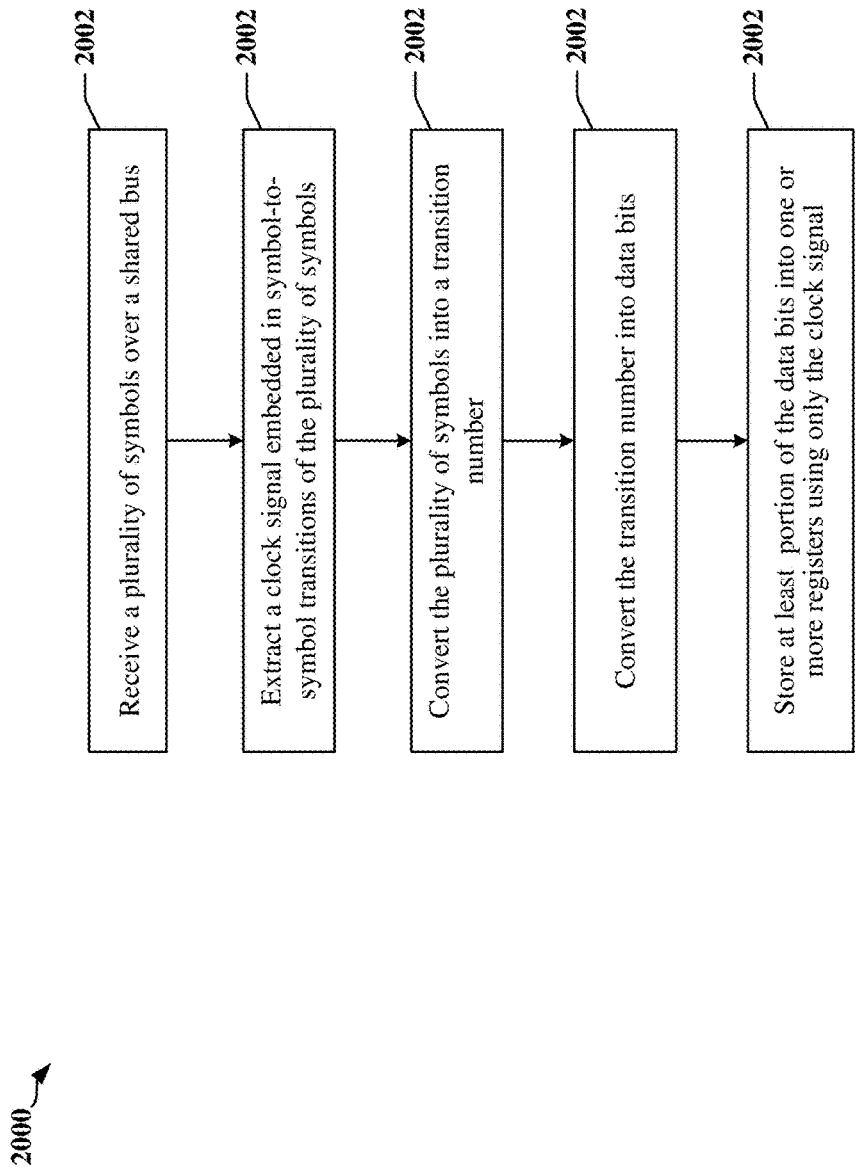
FIG. 20 illustrates a method operational on a slave device to receive a transmission over a shared bus and store such data within such transmission into registers using only a clock recovered from the transmission.

FIG. 20 is a flow chart 2000 of a method operational on a slave device to receive a transmission over a shared bus and store such data within such transmission into registers using only a clock recovered from the transmission. For instance, the method may be implemented by the receiver device in FIG. 13.

At block 2002, a plurality of symbols may be received over a shared bus. The shared bus may be a CCIe bus. The symbols may transition every clock cycle such that no two sequential symbols have the same value.

At block 2004, a clock signal embedded in symbol-to-symbol transitions of the plurality of symbols is extracted.

At block 2006, the plurality of symbols may be converted into a transition number. The transition number may be a twelve digit ternary number.

At block 2008, the transition number may be converted into data bits. The transition number may be converted into the data bits between a penultimate clock cycle and a last clock cycle of the clock signal.

At block 2010, at least a portion of the data bits may be stored into one or more registers using only the clock signal. The receiver device may receive and write at least a portion of the data bits to the one or more registers without use of a local free-running clock. The receiver device receives and writes at least a portion of the data bits to the one or more registers while the receiver is in a sleep mode. At least a portion of the data bits is written into the one or more registers by starting a down counter upon detection of a first cycle of the clock signal, triggering a marker when the down counter reaches a pre-defined value, and using the marker to store at least a portion of the data bits into registers. The pre-defined value may occur when a final clock cycle of the clock signal is reached. At least a portion of the data bits may be stored into registers at a last clock cycle of the clock signal.

In one example, the receiver device may independently enter a sleep mode without notifying any other devices coupled to the shared bus.

Figure 21:
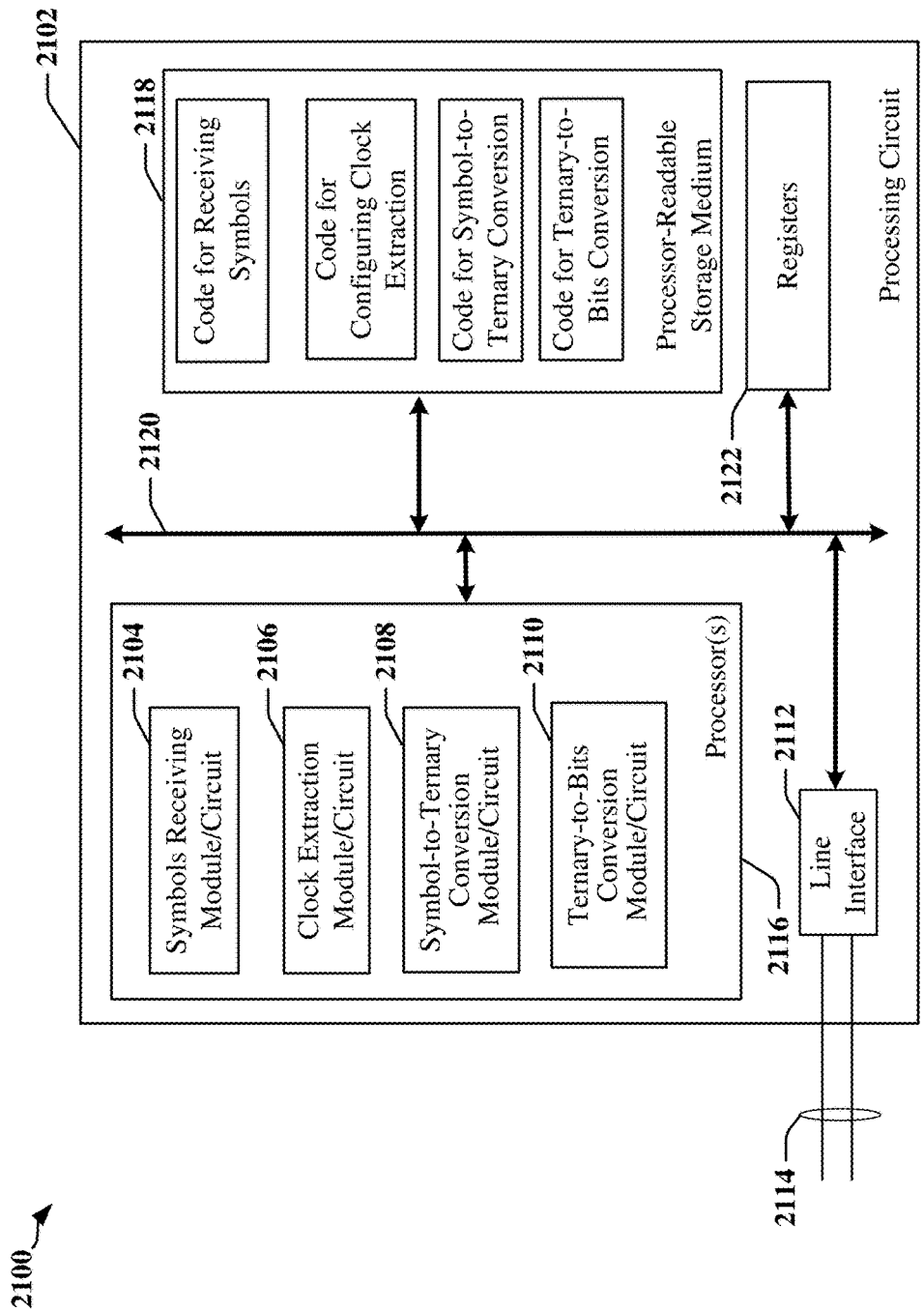
FIG. 21 is a diagram illustrating an example of a hardware implementation for an apparatus employing a processing employing a processing circuit adapted according to certain aspects disclosed herein.

FIG. 21 is a diagram illustrating a simplified example of a hardware implementation for an apparatus 2100 employing a processing circuit 2102. The processing circuit typically has a processor 2116 that may include one or more of a microprocessor, microcontroller, digital signal processor, a sequencer and a state machine. The processing circuit 2102 may be implemented with a bus architecture, represented generally by the bus 2120. The bus 2120 may include any number of interconnecting buses and bridges depending on the specific application of the processing circuit 2102 and the overall design constraints. The bus 2120 links together various circuits including one or more processors and/or hardware modules, represented by the processor 2116, the modules or circuits 2104, 2106, 2108 and 2110, line interface circuits 2112 configurable to communicate over connectors or wires of a serial bus 2114, one or more registers 2122 that cooperate with symbol/ternary conversion circuitry, and the computer-readable storage medium 2118. The bus 2120 may also link various other circuits such as timing sources, peripherals, voltage regulators, and power management circuits, which are well known in the art, and therefore, will not be described any further.

The processor 2116 is responsible for general processing, including the execution of software stored on the computer-readable storage medium 2118. The software, when executed by the processor 2116, causes the processing circuit 2102 to perform the various functions described supra for any particular apparatus. The computer-readable storage medium 2118 may also be used for storing data that is manipulated by the processor 2116 when executing software, including data decoded from symbols transmitted over the connectors 2114, which may be configured as data lanes and clock lanes. The processing circuit 2102 further includes at least one of the modules 2104, 2106, 2108 and 2110. The modules 2104, 2106, 2108 and 2110 may be software modules running in the processor 2116, resident/stored in the computer-readable storage medium 2118, one or more hardware modules coupled to the processor 2116, or some combination thereof. The modules 2104, 2106, 2108 and/or 2110 may include microcontroller instructions, state machine configuration parameters, or some combination thereof.

In one configuration, the apparatus 2100 for wireless communication includes a module and/or circuit 2104 that is configured to receive a plurality of symbols over the serial bus 2114, a module and/or circuit 2106 that is configured to extract a clock signal embedded in symbol-to-symbol transitions of the plurality of symbols, a module and/or circuit 2108 that is configured to convert the plurality of symbols into a transition number, a module and/or circuit 2108 that is configured to convert the transition number into data bits, and a module and/or circuit 2122 that is configured to store at least part of the data bits into registers using only the clock signal.

One or more of the components, steps, features, and/or functions illustrated in the Figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

In addition, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels and various other mediums capable of storing, containing, or carrying instruction(s) and/or data.

Furthermore, embodiments may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method performed by a receiver device, comprising:
   receiving a plurality of symbols over a shared bus;
   extracting a clock signal embedded in symbol-to-symbol transitions of the plurality of symbols;
   converting the plurality of symbols into a transition number;
   converting the transition number into data bits; and
   storing at least a portion of the data bits into one or more registers using only the clock signal,
   wherein received symbols transition every clock cycle such that no two sequential symbols have the same value.

2. The method of claim 1, where the receiver device independently enters a sleep mode without notifying any other devices coupled to the shared bus.

3. The method of claim 1, where the receiver device receives and writes at least a portion of the data bits to the one or more registers without use of a local free-running clock.

4. The method of claim 1, where the receiver device receives and writes at least a portion of the data bits to the one or more registers while the receiver is in a sleep mode.

5. The method of claim 1, wherein the transition number is expressed as a ternary number.

6. The method of claim 1, wherein the transition number is a twelve digit ternary number.

7. The method of claim 1, wherein the shared bus is a camera control interface extended (CCIe) bus.

8. The method of claim 1, wherein at least a portion of the data bits are written into the one or more registers by:
   starting a down counter upon detection of a first cycle of the clock signal,
   triggering a marker when the down counter reaches a pre-defined value, and
   using the marker to store at least a portion of the data bits into registers.

9. The method of claim 8, wherein the pre-defined value occurs when a final clock cycle of the clock signal is reached.

10. The method of claim 1, wherein
    the transition number is converted into the data bits between a penultimate clock cycle and a last clock cycle of the clock signal; and
    the at least a portion of the data bits is stored into registers at a last clock cycle of the clock signal.

11. A device comprising:
    a bus interface coupling the device to a shared bus such that a plurality of symbols is received from the shared bus;
    a clock and data recovery circuit that receives signals from two or more wires of the shared bus and that extracts a clock signal based on transitions between pairs of consecutive symbols in the plurality of symbols, wherein the clock and data recovery circuit provides a multi-bit signal representative of the plurality of symbols;
    a symbol-to-transition number circuit that receives the multi-bit signal provided by the clock and data recovery circuit and outputs a transition number representative of differences in value of the multi-bit signal corresponding to transitions between each pair of consecutive symbols in the plurality of symbols;
    a ternary-to-binary number circuit that receives the transition number from the symbol-to-transition number circuit and converts the transition number into binary data bits; and one or more registers that receive and store at least a portion of the binary data bits using only the clock signal extracted by the clock and data recovery circuit,
wherein received symbols transition every clock cycle such that no two sequential symbols have the same value.

12. The device of claim 11, where the device is adapted to independently enter a sleep mode without notifying any other devices coupled to the shared bus.

13. The device of claim 11, where at least a portion of the binary data bits are read from, or written into the one or more registers without use of a local free-running clock.

14. The device of claim 11, where at least a portion of the binary data bits are read from, or written into the one or more registers while the device is in a sleep mode.

15. The device of claim 11, wherein the transition number is expressed as a multi-digit ternary number.

16. The device of claim 11, wherein the transition number is a twelve digit ternary number.

17. The device of claim 11, wherein the shared bus is a camera control interface extended (CCIe) bus.

18. The device of claim 11, further comprising:
a down counter, wherein the device is adapted to receive and write at least a portion of the binary data bits into the one or more registers by:
starting the down counter upon detection of a first cycle of the clock signal;
triggering a marker when the down counter reaches a pre-defined value; and
using the marker to store at least a portion of the binary data bits into registers.

19. The device of claim 18, wherein the pre-defined value occurs when a final clock cycle of the clock signal is reached.

20. A receiver device comprising:
means for providing a multi-bit signal representative of a plurality of symbols received from a shared bus;
means for extracting a clock signal embedded in symbol-to-symbol transitions of the plurality of symbols;
means for converting a transition number into binary data bits, wherein the transition number is a ternary representation of differences in value of the multi-bit signal corresponding to transitions between each pair of consecutive symbols in the plurality of symbols; and
means for storing at least a portion of the data bits, the means for storing including one or more registers that are adapted to store data bits using only the clock signal,
wherein received symbols transition every clock cycle such that no two sequential symbols have the same value.

21. The receiver device of claim 20, where the receiver device independently enters a sleep mode without notifying any other devices coupled to the shared bus.

22. The receiver device of claim 20, wherein the means for storing at least a portion of the data bits is operable to:
write at least a portion of the data bits to the one or more registers without using a local free-running clock.

23. The receiver device of claim 20, wherein the means for storing at least a portion of the data bits includes a circuit operable to:
write at least a portion of the data bits to the one or more registers while the receiver device is in a sleep mode.

24. The receiver device of claim 20, wherein the transition number is a twelve digit ternary number.

25. The receiver device of claim 20, wherein the means for storing at least a portion of the data bits includes a circuit that is operable to:
start a down counter upon detection of a first cycle of the clock signal,
trigger a marker when the down counter reaches a pre-defined value, and
use the marker to store at least a portion of the data bits into the one or more registers,
wherein the pre-defined value occurs when a final clock cycle of the clock signal is reached.

26. The receiver device of claim 20, wherein the means for converting the transition number into data bits includes a circuit that is operable to:
convert the transition number into the data bits between a penultimate clock cycle and a last clock cycle of the clock signal; and
wherein the means for storing at least a portion of the data bits is operable to:
store at least a portion of the data bits into the one or more registers at a last clock cycle of the clock signal.

27. A non-transitory machine-readable storage medium having instructions stored thereon, which when executed by at least one processor, cause the at least one processor to:
receive a plurality of symbols over a shared bus;
extract a clock signal embedded in symbol-to-symbol transitions of the plurality of symbols;
convert the plurality of symbols into a transition number;
convert the transition number into a data bits; and
store at least a portion of the data bits into one or more registers using only the clock signal,
wherein received symbols transition every clock cycle such that no two sequential symbols have the same value.

* * * * *